(12) United States Patent
Miyaguchi et al.

(10) Patent No.: US 6,763,450 B1
(45) Date of Patent: Jul. 13, 2004

(54) PROCESSOR

(75) Inventors: Hiroshi Miyaguchi, Tokyo (JP); Tsuyoshi Akiyama, Tsuchiura (JP); Hidetoshi Onuma, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 595 days.

(21) Appl. No.: 09/680,609

(22) Filed: Oct. 6, 2000

(30) Foreign Application Priority Data

Oct. 8, 1999 (JP) .......................................... 11-288169

(51) Int. Cl.$^7$ ................................................ G06F 9/38
(52) U.S. Cl. ...................... 712/215; 712/241; 712/22; 712/35
(58) Field of Search ........................ 712/22, 35, 215, 712/24

(56) References Cited

U.S. PATENT DOCUMENTS 5,210,836 A * 5/1993 Childers et al. ............ 712/241

* cited by examiner

*Primary Examiner*—William M. Treat
(74) *Attorney, Agent, or Firm*—William B. Kempler; W. James Brady, III; Frederick J. Telecky, Jr.

(57) ABSTRACT

The objective of the invention is to improve the processing efficiency of a system that repeatedly executes one instruction over multiple clock cycles. The SVP core 12 of this SVP (Scan-line Video Processor) 10 is made up of a three layer construction of the data input register (DIR) 16, the SIMD type digital signal processing unit 18, and the data output register (DOR) 20. The SIMD type digital signal processing unit 18 comprises a parallel arranged (connected) number of processing elements (PE0 to PEN-1) (for example, 864 units) equal to the number of pixels N on one horizontal scan line. The instruction generator (IG) 14, because the SVP core 12 operates as an SIMD parallel processor, internally houses a RAM or ROM program memory that holds the desired program. The program stored in program memory contains not only the instructions (SIMD instruction) for the processing elements (PE0 to PEN-1) of the processing unit 18, but also such instructions (IG instruction) as jump, subroutine call, hardware interrupt, and the like. In this SVP 10, when an IG instruction is read from the program memory while the repetitive processing of an SIMD instruction is being conducted in the SVP core 12, the pertinent IG instruction is executed in parallel with the repetitive processing of the pertinent SIMD instruction.

15 Claims, 11 Drawing Sheets

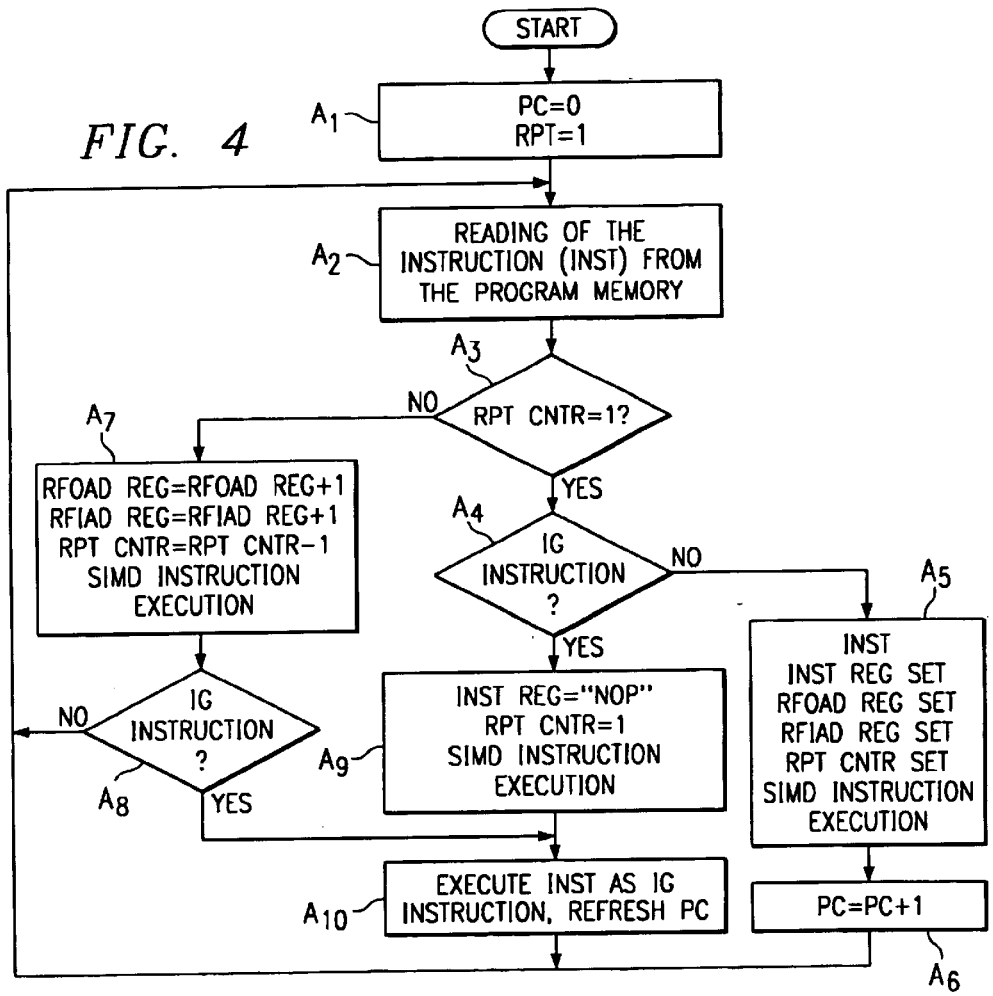

FIG. 6

| CLOCK CYCLE | INSTRUCTION READ | RPT CNTR? | IG INSTRUCTION? | SIMD EXECUTION | RPT CNTR | IG EXECUTION | PC |
|---|---|---|---|---|---|---|---|
| 1 | 0 | 1 | NO | [0] | 8 |  | 1 |
| 2 | 1 | 8 | YES | [0] | 7 | [1] | 2 |
| 3 | 2 | 7 | YES | [0] | 6 | [2] | 3 |
| 4 | 3 | 6 | YES | [0] | 5 | [3] | 4 |
| 5 | 4 | 5 | YES | [0] | 4 | [4] | 10 |
| 6 | 10 | 4 | NO | [0] | 3 |  | 10 |
| 7 | 10 | 3 | NO | [0] | 2 |  | 10 |
| 8 | 10 | 2 | NO | [0] | 1 |  | 10 |
| 9 | 10 | 1 | NO | [10] | 8 |  | 11 |
| 10 | 11 | 8 | YES | [10] | 7 | [11] | 5 |
| 11 | 5 | 7 | NO | [10] | 6 |  | 5 |
| 12 | 5 | 6 | NO | [10] | 5 |  | 5 |
| 13 | 5 | 5 | NO | [10] | 4 |  | 5 |
| 14 | 5 | 4 | NO | [10] | 3 |  | 5 |
| 15 | 5 | 3 | NO | [10] | 2 |  | 5 |
| 16 | 5 | 2 | NO | [10] | 1 |  | 5 |
| 17 | 5 | 1 | NO | [5] | 1 |  | 6 |
| 18 | 6 | 1 | NO | [6] | 7 |  | 7 |
| 19 | 7 | 7 | NO | [6] | 6 |  | 7 |
| 20 | 7 | 6 | NO | [6] | 5 |  | 7 |
| 21 | 7 | 5 | NO | [6] | 4 |  | 7 |
| 22 | 7 | 4 | NO | [6] | 3 |  | 7 |
| 23 | 7 | 3 | NO | [6] | 2 |  | 7 |
| 24 | 7 | 2 | NO | [6] | 1 |  | 7 |
| 25 | 7 | 1 | NO | [7] | 1 |  | 8 |
| 26 | 8 | 1 | YES | NOP | 1 | [8] | 9 |
| 27 | 9 | 1 | YES | NOP | 1 | [9] | 0 |
| 28 | 0 | 1 | NO | [0] | 8 |  | 1 |
| 29 | 1 | 8 | YES | [0] | 7 | [1] | 2 |
| 30 | 2 | 7 | YES | [0] | 6 | [2] | 3 |

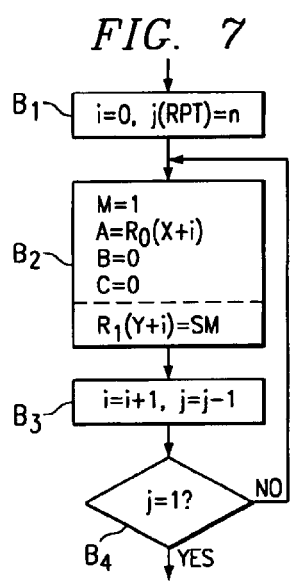
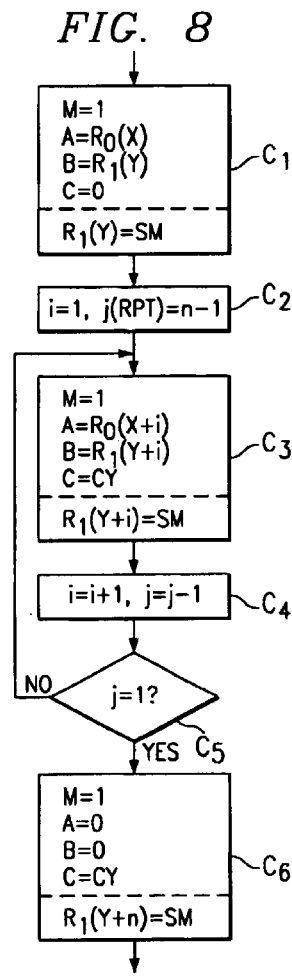
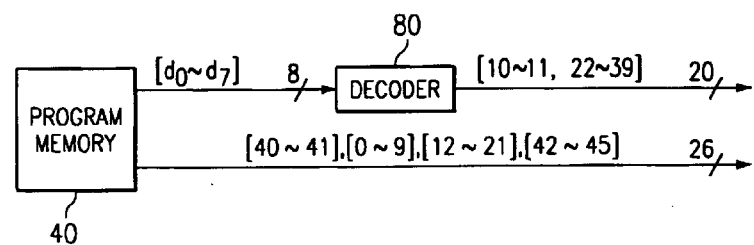

FIG. 11

| CLOCK CYCLE | INSTRUCTION READ | RPT CNTR? | EMPTY? | SIMD EXECUTION | RPT CNTR | IG INSTRUCTION? | IG EXECUTION | FULL? | FIFO | PC |
|---|---|---|---|---|---|---|---|---|---|---|
| 1 | 0 | 1 | YES | NOP |  |  |  |  |  | 1 |
| 2 | 1 | 1 | NO | [0] | 1 | NO |  | NO | [0] | 2 |
| 3 | 2 | 8 |  | [0] | 8 | YES | [1] |  |  | 3 |
| 4 | 3 | 7 |  | [0] | 7 | YES | [2] |  |  | 4 |
| 5 | 4 | 6 |  | [0] | 6 | YES | [3] |  |  | 10 |
| 6 | 10 | 5 |  | [0] | 5 | YES | [4] |  |  | 11 |
| 7 | 11 | 4 |  | [0] | 4 | NO |  |  | [10] | 5 |
| 8 | 5 | 3 |  | [0] | 3 | YES | [11] | NO | [10] | 6 |
| 9 | 6 | 2 |  | [0] | 2 | NO |  | NO | [10],[5] | 6 |
| 10 | 6 | 1 | NO | [0] | 1 | NO |  | YES | [10],[5] | 7 |
| 11 | 7 | 8 |  | [10] | 8 | NO |  | NO | [5],[6] | 7 |
| 12 | 7 | 7 |  | [10] | 7 | NO |  | YES | [5],[6] | 7 |
| 13 | 7 | 6 |  | [10] | 6 | NO |  | YES | [5],[6] | 7 |
| 14 | 7 | 5 |  | [10] | 5 | NO |  | YES | [5],[6] | 7 |
| 15 | 7 | 4 |  | [10] | 4 | NO |  | YES | [5],[6] | 7 |
| 16 | 7 | 3 |  | [10] | 3 | NO |  | YES | [5],[6] | 7 |
| 17 | 7 | 2 | NO | [5] | 2 | NO |  | YES | [5],[6] | 7 |
| 18 | 7 | 1 | NO | [6] | 1 | NO |  | NO | [6],[7] | 8 |
| 19 | 8 | 1 |  | [6] | 7 | YES | [8] |  | [7] | 9 |
| 20 | 9 | 7 |  | [6] | 6 | YES | [9] |  | [7] | 0 |

FIG. 12

| CLOCK CYCLE | INSTRUCTION READ | RPT CNTR? | EMPTY? | SIMD EXECUTION | RPT CNTR | IG INSTRUCTION? | IG EXECUTION | FULL? | FIFO | PC |
|---|---|---|---|---|---|---|---|---|---|---|
| 21 | 0 | 6 | | | 5 | NO | | NO | [7],[0] | 1 |
| 22 | 1 | 5 | | [6] | 4 | YES | [1] | | [7],[0] | 2 |
| 23 | 2 | 4 | | [6] | 3 | YES | [2] | | [7],[0] | 3 |
| 24 | 3 | 3 | | [6] | 2 | YES | [3] | | [7],[0] | 4 |
| 25 | 4 | 2 | | [6] | 1 | YES | [4] | | [7],[0] | 10 |
| 26 | 10 | 1 | NO | [6] | 1 | NO | | NO | [0],[10] | 11 |
| 27 | 11 | 1 | NO | [7] | 8 | YES | [11] | | [10] | 5 |
| 28 | 5 | 8 | | [0] | 7 | NO | | NO | [10],[5] | 6 |
| 29 | 6 | 7 | | [0] | 6 | NO | | YES | [10],[5] | 6 |
| 30 | 6 | 6 | | [0] | 5 | NO | | YES | [10],[5] | 6 |
| 31 | 6 | 5 | | [0] | 4 | NO | | YES | [10],[5] | 6 |
| 32 | 6 | 4 | | [0] | 3 | NO | | YES | [10],[5] | 6 |
| 33 | 6 | 3 | | [0] | 2 | NO | | YES | [10],[5] | 6 |
| 34 | 6 | 2 | | [0] | 1 | NO | | YES | [10],[5] | 6 |
| 35 | 6 | 1 | NO | [10] | 8 | NO | | NO | [5],[6] | 7 |
| 36 | 7 | 8 | | [10] | 7 | NO | | YES | [5],[6] | 7 |

PROCESSOR

FIELD OF THE INVENTION

The present invention pertains to a processor for digital signal processing, and more specifically, it pertains to a processor that is equipped with a function that repeatedly executes one instruction over a number of clock cycles.

BACKGROUND OF THE INVENTION

For this type of processor, for example, the SIMD (Single-Instruction-Multiple-Data) type parallel processor is known. In a SIMD type parallel processor, a large number (normally, at least 100 units or more) of processing elements are arranged in parallel so that the same instruction is executed in parallel. Each processing element comprises a one bit DSP (Digital-Signal-Processor), and executes a single one-bit arithmetic operation within one clock cycle. Therefore, for example, to shift a single set of eight-bit data, a one-bit data shift is repeatedly conducted eight times over eight clock cycles. Also, in the addition of two sets of eight-bit data which results in a nine-bit sum (the highest-order bits of the data produce a carry bit), a one-bit addition calculation is repeatedly executed nine times over nine clock cycles. Understandably, because a large number of arithmetic operations are conducted simultaneously on a large number of processing elements, overall, the realization of high processing performance is possible.

In the above-mentioned SIMD type parallel processors, in the instruction execution unit that executes a common instruction on each processing element, besides the instruction (SIMD instruction) for the processing element, preparations are also made for instructions related to jump, sub-routine call, and hardware interrupt. Also, non-SIMD instructions are executed by an instruction execution unit that is separate from the processing element.

In conventional SIMD type parallel processors, the execution sequence for the program follows an order such that each instruction is executed serially one at a time without respect to whether it is an SIMD instruction or a non-SIMD instruction. Therefore, during the execution of an SIMD instruction in the instruction execution unit of a processing element, when a non-SIMD instruction is retrieved from the program memory, said non-SIMD instruction is placed in a standby condition until the execution of said SIMD instruction is completed, and after the execution of said SIMD instruction is completed, said non-SIMD instruction is executed in the above-mentioned instruction execution unit. Also, during the execution of a non-SIMD instruction, a NOP (No-Operation) instruction that designates the non-execution of an instruction is applied to the processing element. However, the processing of all the processing elements each time a non-SIMD instruction is executed is essentially stopped or suspended, and the processing performance is limited.

The present invention was designed in consideration of these problems, and its purpose is to offer a processor that improves the processing efficiency of a system that repeatedly executes one instruction over a large number of clock cycles.

Another purpose of the present invention is to offer a processor that can reduce the memory capacity required for program memory.

SUMMARY OF THE INVENTION

In order to achieve the above-mentioned purposes, one aspect of the present invention has a first instruction execution unit that repetitively executes a first-type instruction on one or a plurality of microprocessors, a second instruction execution unit that independently executes a second-type instruction from the above-mentioned first instruction execution unit, a program memory that stores a program containing instructions of the first type and instructions of the second type, an instruction read means that sequentially reads out instructions of the first type and the second type from the above-mentioned program memory according to the execution sequence for the program, and an instruction execution control means that, when an instruction of the second type is read from the above-mentioned program memory during the execution of an instruction of the first type, executes the instruction of said second type in the above-mentioned second instruction execution unit in parallel with the execution of the instruction of said first type in the above-mentioned first instruction execution unit.

Another aspect of the present invention, in regard to an instruction of the second type that is read from the program memory in the middle of the repetitive execution of an instruction of the first type in the first instruction execution unit, since the second instruction execution unit executes the instruction of the second type in parallel with the processing operation of the first instruction execution unit, the operating efficiency for the first instruction execution unit, and by extension, the throughput for the entire system, is increased.

In a third aspect of the present invention, preferably, the above-mentioned first instruction execution unit has a processing unit that executes the process designated by the instruction code of a first-type instruction within one clock cycle in units of one bit, a microinstruction register that, in regard to the above-mentioned instructions of the first type that are read from the above-mentioned program memory, applies the instruction code of that instruction to the above-mentioned processing unit as a microinstruction, an address counter that, for each instruction of the above-mentioned first type that is read from the above-mentioned program memory, sequentially applies to the above-mentioned processing unit data addresses related to those instructions while incrementing or decrementing in each single clock cycle from the initial value to the prescribed end value, and a repeat counter that, in regard to each instruction of the above-mentioned first type that is read from the above-mentioned program memory, counts the number of times the process designated by the above-mentioned instruction code is repeatedly executed in the above-mentioned processing unit.

A fourth aspect of the present invention preferably has a first-in first-out type memory that stores the instructions of the first type that are read from the above-mentioned program memory in a first-in first-out format, and provides the instructions of the first type that have been read to the first instruction execution unit.

In this case, even if an instruction of the second type that is to be executed simultaneously with the execution sequence of the instruction of the first type is read, the invention can have a construction wherein the instruction is temporarily stored in the first-in first-out type memory, and is executed in the second instruction execution unit at the point in time at which it is read from the first-in first-out type memory.

In a fifth aspect of the present invention, in order to reduce the required capacity of the program memory, it can be made a construction wherein a portion or all of each instruction is encoded and stored in the above-mentioned program memory, and a decoder is provided that decodes the instructions read from the above-mentioned program.

BRIEF DESCRIPTION OF THE DRAWINGS

FIG. 4 is a flowchart showing the routine for the program execution process in the SVP of the embodiment.

FIG. 5 is a program list showing an example of a program that can be executed by the SVP of the embodiment.

FIG. 6 is a diagram showing the status or operation of each section within the SVP for each clock cycle in the case of executing a program example with the SVP of the embodiment.

FIG. 7 is a flowchart showing the processing routine for a move instruction in the SVP of the embodiment.

FIG. 8 is a flowchart showing the processing routine for an add instruction in the SVP of the embodiment.

FIG. 11 is a diagram showing the status or operation of each section within the SVP for each clock cycle in the case of executing a program example with the SVP of Embodiment 2.

FIG. 12 is a diagram showing the status or operation of each section within the SVP for each clock cycle in the case of executing a program example with the SVP of Embodiment 2.

FIG. 14 is a diagram showing one embodiment for the purpose of reducing the required memory capacity of a program memory in the present invention.

REFERENCE NUMERALS AS SHOWN IN THE DRAWINGS

Figure 10:
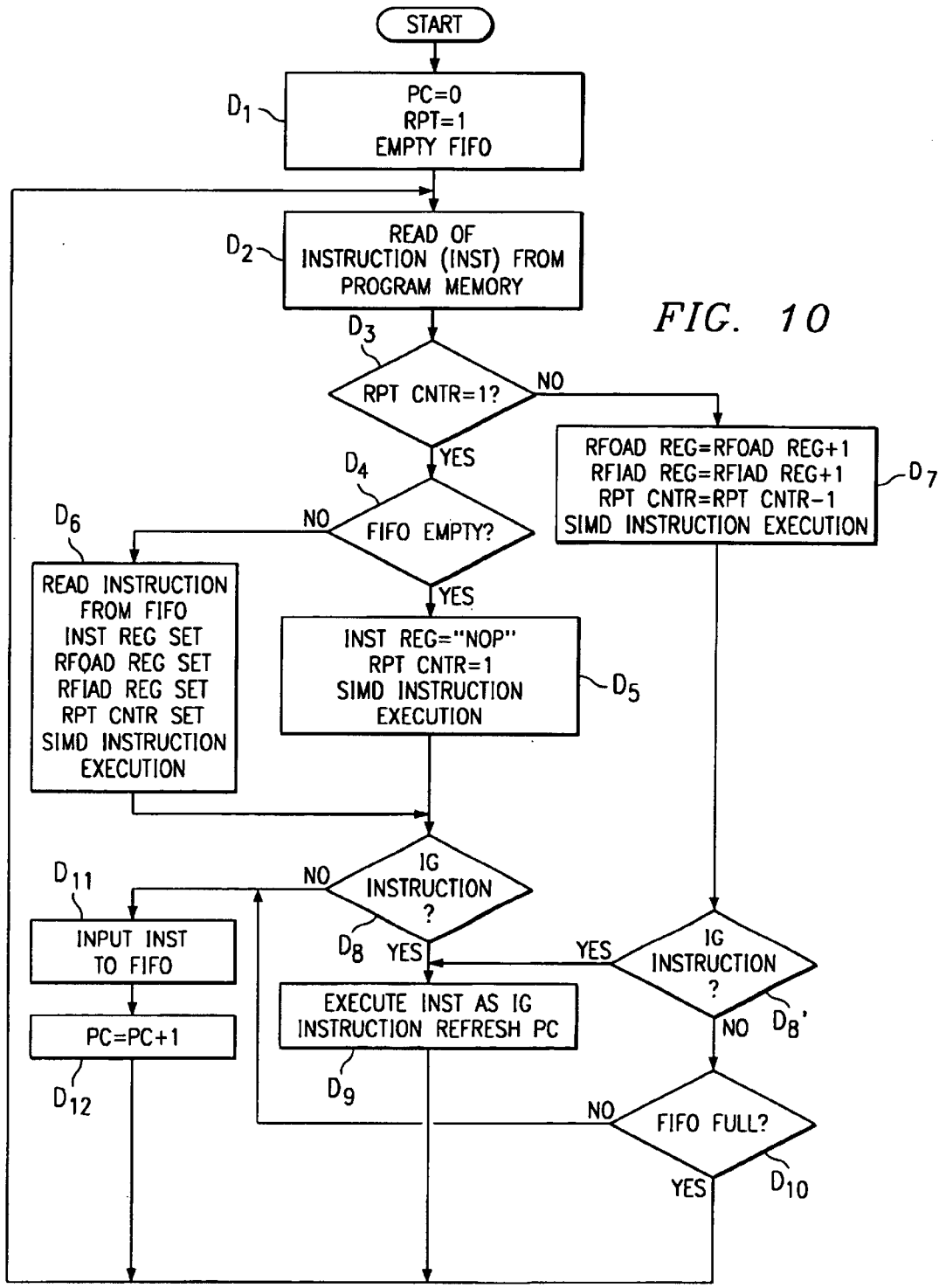
FIG. 10 is a flowchart showing the routine for the program execution process in the SVP of Embodiment 2.

In the figures 10 represents SVP, 12 represents SVP core, 14 represents instruction generator (IG), 18 represents digital signal processing unit no time, 40 represents program memory, 42 represents program counter, 44 represents IG instruction execution unit, 46 represents microinstruction register, 48, 50 represents address counter, 52 represents repeat counter, 54 represents matching circuit, 56, 58 represent switch, 70 represents FIFO memory, and 80 represents decoder.

DESCRIPTION OF THE EMBODIMENTS

Below, embodiments of the present invention are explained with reference to the appended figures.

Figure 1:
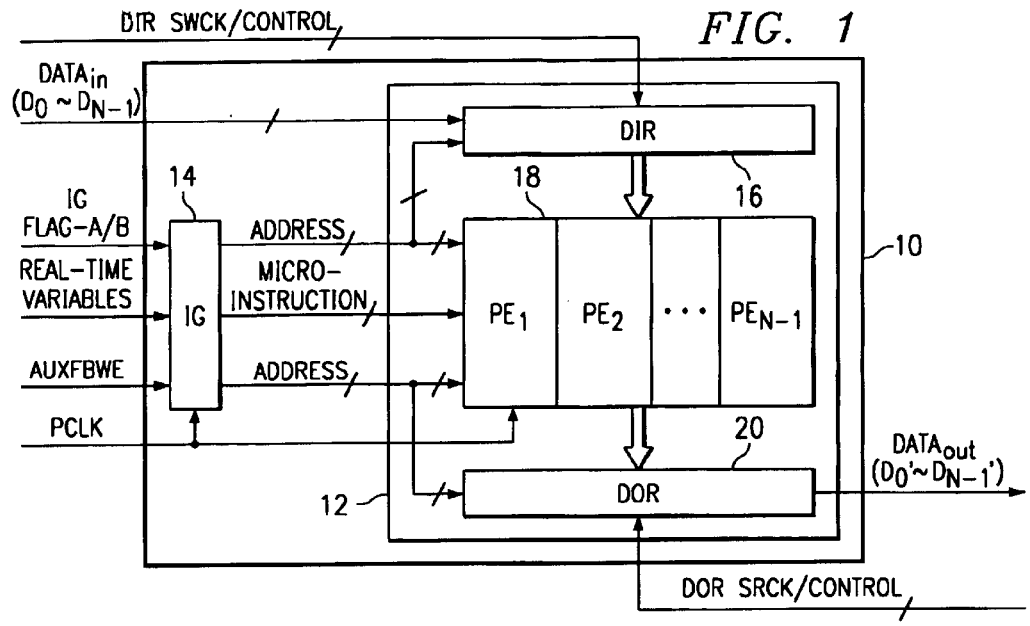
FIG. 1 is a block diagram showing the construction of an SIMD type parallel processor according to an embodiment of the present invention.

In FIG. 1, the construction of an SIMD type parallel processor according to one embodiment of the present invention is shown. This SIMD type parallel processor is constructed as an SVP (Scan-line Video Processor) 10 wherein a video signal is input in units of scan lines, the signal undergoes parallel arithmetic operations, and the result is output.

This SVP 10 carries an SVP core 12 and an instruction generator (IG) 14 on a single chip. The SVP core 12 is a three layer construction made up of a data input register (DIR) 16, an SIMD type digital signal processing unit 18, and a data output register (DOR).

The DIR 16 operates according to a control signal <Control> from an external control circuit, a clock signal <SWCK> from an external clock circuit, and an address <ADDRESS> from the IG 14, and continuously inputs the image data (D0 to DN−1) (for example, 48 bits X 864 pixels) of, for example, up to three lines of horizontal scan lines.

The SIMD type digital signal processing units 18 is made up of the processing elements (PE0 to PEN−1) arranged in parallel in a number equal to the number of pixels (N) on one horizontal scan line (for example, 864 units). These processing elements (PE0, PE1, ===PEN−1) are operated in parallel according to an address <ADDRESS> and the microinstruction <MICROINSTRUCTION> from the IG 14, and a clock signal <PCLK> from an external clock circuit, and they execute the same image processing calculations within one horizontal scan period for corresponding pixel data (D0, D1, ===DN−1).

The DOR 20 operates according to a control signal <Control> from an external control circuit, a clock signal <SRCK> from an external clock circuit, and an address <ADDRESS> from the IG 14, and outputs the arithmetic processing results all together from the processing elements (PE0 to PEN−1) in each horizontal scan period as the image data (D0' to DN−1') (for example, 32 bits×864 pixels) for one horizontal scan line.

The clock signals <SWCK>, <PCLK>, and <SRCK> that are supplied to the DIR 16, the processing unit 18, and the DOR 20, respectively, do not have to be synchronized. Also, the data transfer from the DIR 16 to the processing unit 18, and the data transfer from the processing unit 18 to the DOR 20 can be conducted within the respective horizontal blanking periods.

In this way, the data input, the parallel arithmetic processing, and the data output are executed asynchronously and in parallel in a pipeline system by means of the DIR 16, the processing unit 18, and the DOR 20, respectively, and real-time image processing is conducted.

The IG 14 internally houses a program memory made up of a RAM or ROM that holds the required program for the purpose of the SVP core 12 operating as an SIMD type parallel processor, and it is made so that an external section conducts a jump, sub-routine call, interrupt, and the like according to flag signals <IGFLAG−A/B>, and the like. The flag signal <IGFLAG−A/B>, for example, is input in synchronization with a horizontal synchronization signal <HSYNC> that is extracted from the input image signal.

Figure 2A:
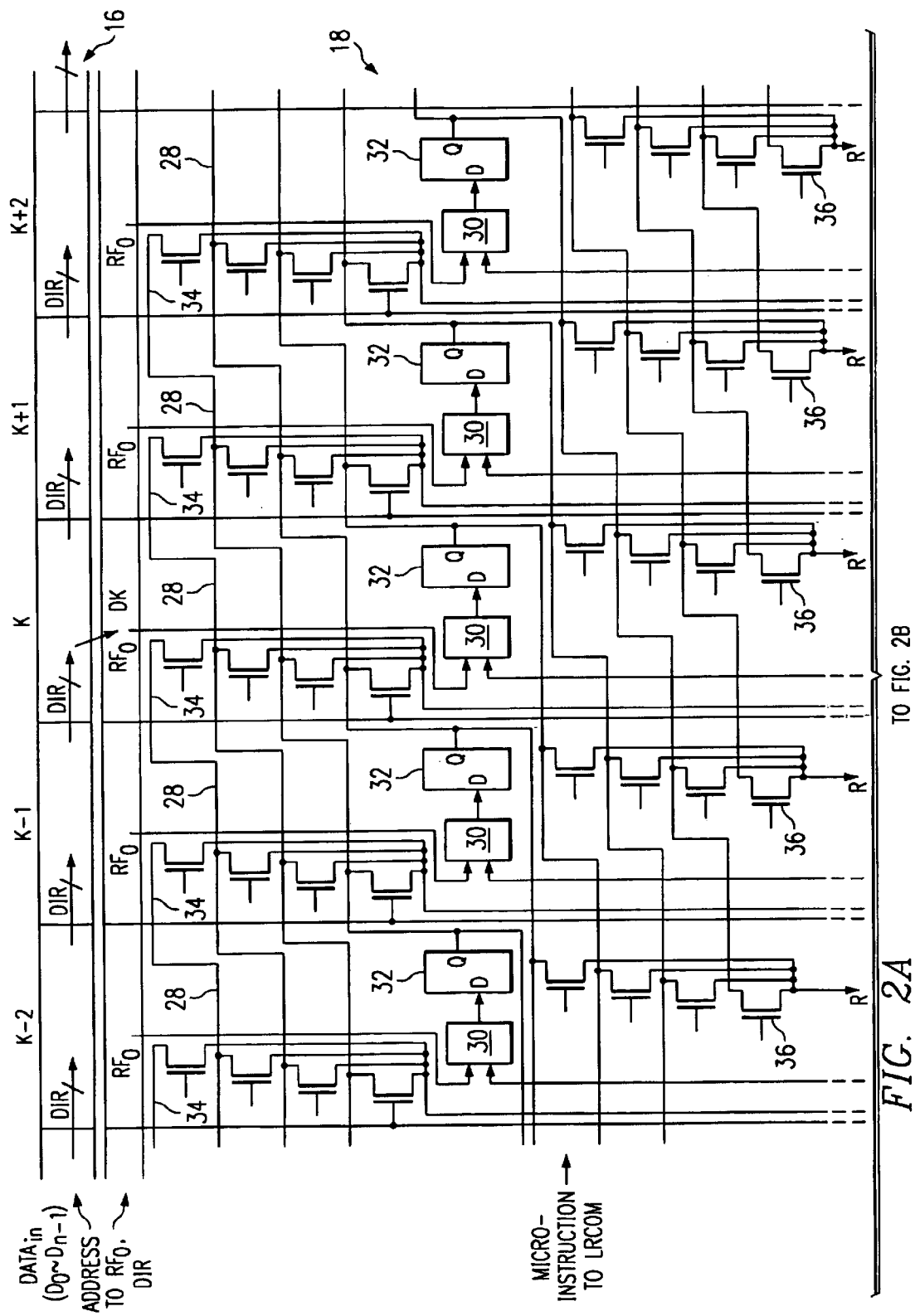
FIGS. 2A and 2B are simplified diagram for explaining the operation of the internal portion of the SVP core in this embodiment.
Figure 2B:
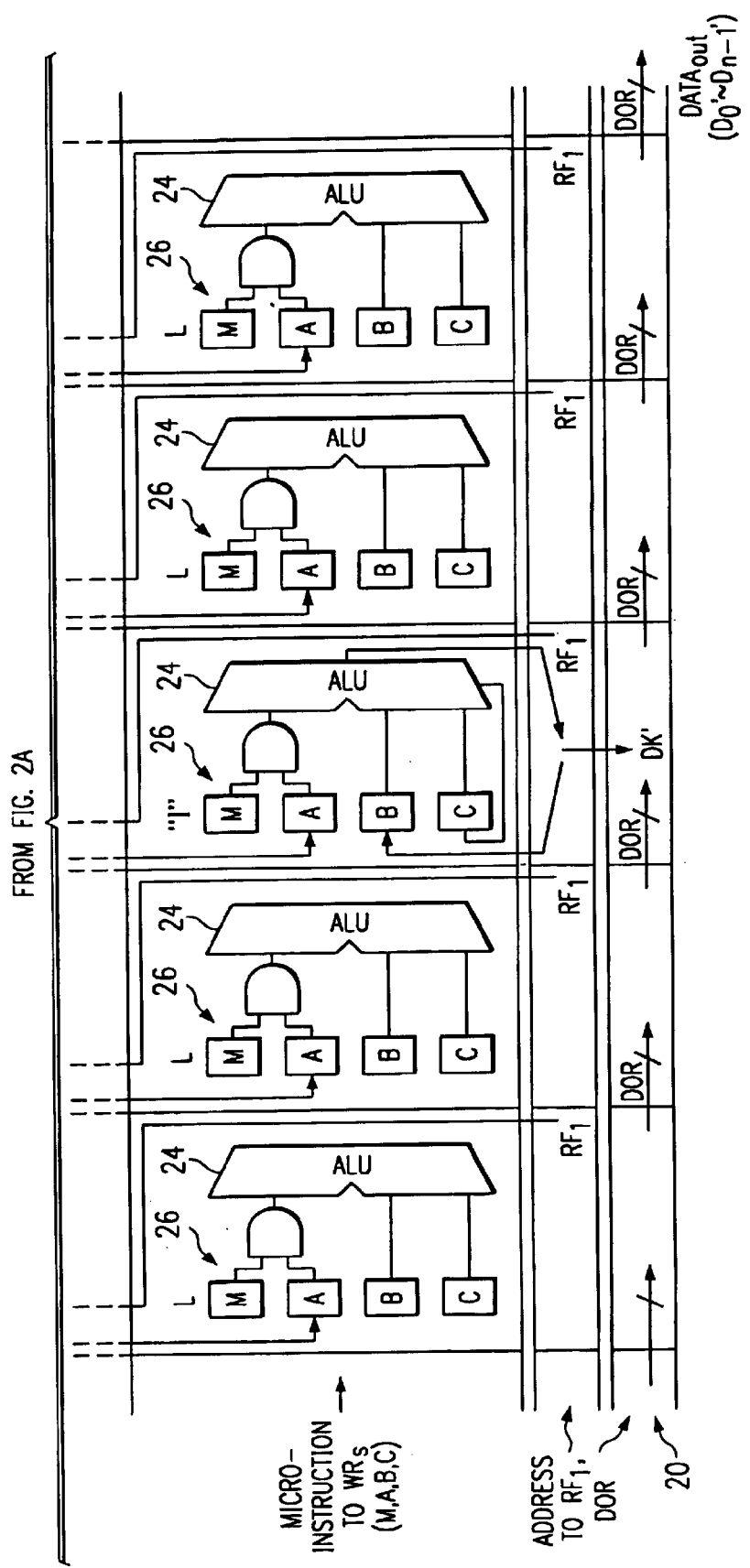

Here, the operation of the internal section of the SVP core 12 is explained based on FIG. 2. The operation of each section within the SVP core 12, as mentioned above, is controlled by means of an address <ADDRESS> and a microinstruction <MICROINSTRUCTION> from the IG 14, and a clock signal <PCLK> from an external clock circuit, and the like.

In FIG. 2, the DIR 16 has a memory capacity (for example, 48 bits×864 words) that can store the input image data (D0 to DN−1) for one line, and it is programmed in units of pixel. During the transfer of the input image data (D0 to DN−1) to the DIR 16, the pixel data (===, DK−2, DK−1, DK, DK+1, DK+2, ===) are shifted out one at a time, and are received in register groups for each block (===, K−2, K−1, K, K+1, K+2, ===) of the DIR 16.

Each processing element (PEK) of the processing unit 18 has a pair of register files (RF0, RF1) that each have a prescribed capacity (for example, 192 bits), one 1-bit arithmetic logic unit (ALU) 24, multiple, for example, four, working registers 26 (M, A, B, C), multiple adjacent left and right units (for example, four units for both left and right) used by processing elements (PEK−4, PEK−3, PEK−2, PEK−1, PEK+1, PEK+2, PEK+3, PEK+4), and L/R (left and right) communication units (LRCOM) 28 that exchange data.

One of the register files (RF0) is connected to a register group for a block corresponding to the DIR 16, and the other register file (RF1) is connected to a register group for a block corresponding to the DOR 20. One-bit data that is read from either one or both of the register files (RF0, RF1), it is input to one of the working registers (M, A, B, C), and it is sent to each of the four adjacent left and right units of processing elements (PEK−4, PEK−3, PEK−2, PEK−1, PEK+1, PEK+2, PEK+3, PEK+4) by means of the multiplexer 30 and latch circuit 32 of the L/R communication units 28.

Simultaneously, the data from each of these adjacent processing elements (PEK−4, PEK−3, PEK−2, PEK−1, PEK+1, PEK+2, PEK+3, PEK+4) are also sent to the multiplexers 34, 36 of the L/R communication units 28 for said processing elements (PEK), and any one of these data sets are selected and input to any one of the working registers (M, A, B, C). In FIG. 2, any one of the data from the left adjacent processing elements (PEK−4, PEK−3, PEK−2, PEK−1) is selected, and this shows the fact that it has been input to the working register (A).

The ALU 24 executes the arithmetic calculations in units of one bit for the data input from the working register (M, A, B, C), and outputs calculation results (sum, carry). Within the calculation results of the ALU 24, the data for sum (SM) is written to one of the register files (RF0, RF1), and the carry bit (CY) is input to the working register (C) by means of a multiplexer that is not illustrated.

The DOR 20 has a memory capacity (for example, 32 bits×864 words) that can store the output image data (D0' to DN−1') for one line, which is made into blocks in units of pixels. At each block, the pixel data (DO' to DN−1') for the arithmetic processing results that have been sent from the processing unit 18 to the DOR 20 over one horizontal scan line period are sent from each block of the DOR 20 in an order so that the pixel data (DO') of the left end is at the beginning and the following pixel data (D1', D2', ===) are threaded together.

As for the processing unit 18, the storing of image data for two lines or more is possible in the register files (RF0, RF1), and by this means, the function of a line memory also becomes executable. Also, as for the processing unit 18, the execution of individual processes in a time-division manner is also possible in regard to the image data for multiple channels within one horizontal scan line period.

Figure 3:
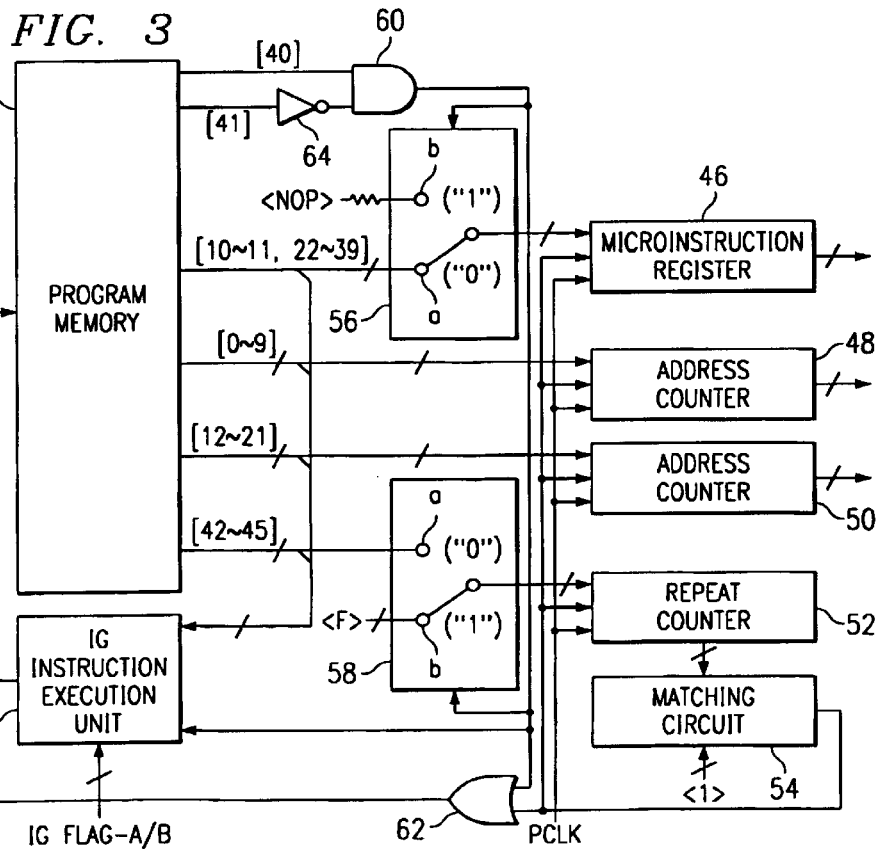
FIG. 3 is a block diagram showing the construction of the essential portions of an instruction generator (IG) in Embodiment 1.

In FIG. 3, the construction of the essential sections of the IG 14 and one embodiment of the present invention is shown.

This IG 14, besides a program memory 40, has a program counter 42, an IG instruction execution unit 44, a microinstruction register 46, address counters 48, 50, repeat counter 52, matching circuit 54, changeover switches 56, 58, gates 60,62, and an inverter 64.

The program memory 40 is made of a ROM (Read Only Memory) or a RAM (Random Access Memory), and holds a program that is necessary for the processing operations of this SIMD type parallel processor. This program stored in this program memory 40 is not only instructions for the processing elements (PE0 to PEN−1) of the processing unit 18 (hereinafter, called the SIMD instructions), but also contains the instructions related to jump, subroutine call, and hardware interrupt (hereinafter, called the IG instructions).

In this embodiment, the individual instructions that construct the program (program data), for example, has a data length of 46 bits (0 to 45). Among the 46 bits (0 to 45), the two bits of data 40, 41 show the type of the pertinent instruction, in other words, either an SIMD instruction or an IG instruction.

In the case of an SIMD instruction, the 10 bits of data in the fields (0 to 9) and (12 to 21) show the initial address for the register files (RF0, RF1), respectively, in each processing element (PEK). Also, the 20 bits of data in the fields (10 to 11, 22 to 39) construct the instruction code for the pertinent SIMD instruction, and this becomes the microinstruction <MICROINSTRUCTION> for the SVP core 12, also, the four bits of data in the fields (42 to 45) show the repeat value (number of times of repetition) for the pertinent SIMD instruction.

In the case of an IG instruction, except for the instruction type recognition data 40, 41, the data (0 to 39, 42 to 45) provide the instruction code and operand (data address) for the pertinent IG instruction.

The program counter 42, in the execution sequence for the program, provides the count value in each processing cycle to the program memory (more specifically, the memory read circuit (not illustrated)) as a memory address.

The IG instruction execution unit 44 executes the IG instructions read from the program memory 40 one at a time. Because the IG instructions in this embodiment, as mentioned above, include jump, subroutine call, interrupt, and the like, there are instances when the execution sequence of the program is changed. The IG instruction execution unit 44 executes the IG instruction in one clock cycle, and sets the memory address designated by that IG instruction in the program counter 42.

The instruction type recognition data 40, 41 read from the program memory 40 are (0, 0) when the pertinent instruction is an SIMD instruction. At this time, the output of the AND gate 60 becomes a logical "0" and both changeover switches 56, 58 are respectively switched to the input terminal (a).

The microinstruction register 46 receives the instruction codes (10 to 11, 22 to 39) within the SIMD instruction read from the program memory 40 by means of the changeover switch 56. During the execution of said SIMD instruction, the microinstruction register 46 provides this instruction code as a microinstruction <MICROINSTRUCTION> to each processing element (PE0 to PEN−1) within the SVP core 12.

As for the address counter 48, the address (0 to 9) within the SIMD instruction that was read from the program memory 40 is input as the initial value. During the execution of said SIMD instruction, the address counter 48 increments the counter value in synchronization with the clock signal <PCLK>, and provides the counter value in each clock cycle as the address <ADDRESS> to one of the register files (RF0) within each processing element (PEK).

As for the address counter 50, the address (12 to 21) within the SIMD instruction that was read from the program memory 40 is input as the initial value. During the execution of said SIMD instruction, the address counter 50 increments the counter value in synchronization with the clock signal <PCLK>, and provides the counter value in each clock cycle as the address <ADDRESS> to the other register file (RF1) within each processing element (PEK).

The repeat counter 52 receives by means of the switch 58 the repeat value (42 to 45) within the SIMD instruction read from the program memory 42 as an initial value for the remaining repeat value (the remaining number of times to repeat) for the pertinent SIMD instruction. During the execution of said SIMD instruction, the repeat counter 52 decrements the count value (the remaining repeat value) in synchronization with the clock signal <PCLK>.

As for the matching circuit 54) the remaining repeat value that is output from the repeat counter 52 is input, and when the remaining repeat value becomes "1," it outputs a logical "1." The matching signal "1" from the matching circuit 54 is input as an increment enable signal to the program counter 42 by means of the OR gate 62. The program counter 42, when it receives the increment enable signal increments the count value (memory address) by one at the next clock pulse <PCLK>.

The matching signal "1" from the matching circuit 54 is input as an input enable signal to the microinstruction register 46, both address counters 48, 50, and the repeat counter 52. When this input enable signal is received, this register 46 and these counters 48, 50, 52 react to the next clock pulse <PCLK>, and input or latch the data from the program memory side.

The instruction type recognition data 40, 41 read from the program memory 40 are (1, 0) when the pertinent instruction is an IG instruction. At this time, the output of the AND gate 60 becomes a logical "1," and both switches 56, 58 are changed over to their corresponding input terminals (b). When the switch 56 is changed over to its corresponding input terminal (b), a code <NOP> for a NOP (No-Operation) instruction indicating a non-execution of an instruction (operation stop) is input to the microinstruction register 46 by means of the changeover switch 56. When the changeover switch 58 is changed over to the input terminal (b), a remaining repeat value <1> indicating that the execution of the instruction is to be repeated once is input to the repeat counter 52 by means of the changeover switch 58.

As mentioned above, when the output of the AND gate 60 due to the IG instruction read from the program memory 40 becomes a logical "1," the signal for this logical "1" is provided as an increment enable signal to the program counter 42 by means of the OR gate 62. In this case also, the program counter 42 increments by one the count value (memory address) at the next clock pulse.

The IG 14 contains the microinstruction register 46, the address counter 48, 50, and the repeat counter 52, as will be explained later, that are associated with the processing of the SVP core 12. These devices are related to the execution of the SIMD instruction, and are functionally classified in the SIMD instruction execution unit.

In FIG. 4, the routine for the program execution process in the SVP 10 of this embodiment is shown. In FIG. 5, one example of a program that is executable by this SVP 10 is shown. In FIG. 6, the status or operation for each unit in each clock cycle is shown for the case of executing the program example (FIG. 5) with this SVP 10. FIG. 7 and FIG. 8 show the process routines for move instructions and add instructions, respectively, in the SVP 10.

Below, the operation of the SVP 10 of this embodiment is explained based on this program example (FIG. 5).

Before starting the execution of this program, for initialization, the count value for the program counter (PC) 42 is set to the initial value "0", and the count value for the repeat counter (RPT CNTR) 52 is set to the initial value "1" (step (A1)).

<<Clock Cycle 1>>

In the initial clock cycle, at step (A2), an instruction (inst) is read from the program memory 40 at the memory address "0" designated by the count value of the program counter (PC) 42.

At step (A3), the count value for the repeat counter (RPT CNTR) 52 becomes "1."Following that, process control enters step (A4), and the configuration for the pertinent instruction (inst) is recognized from the instruction type recognition data 40, 41.

In the case of the program (FIG. 5) of this example, the instruction at the memory address "0" is a move instruction which is a SIMD instruction. The content of this move instruction is R0 [17 (H): 10 (H)] 7 R1 [117 (H): 110 (H)]. In other words, an each processing element (PEK), this causes a transfer of eight bits of data from the addresses "110 (H)" to "117 (H)" of the register file (RF1) to the addresses "10 (H)" to "17 (H)" of the register file (RF0).

More specifically, the "RPT=8" designates the number of repetitions of this instruction, in other words, the repeat value (RPT) is eight (times). The "M=1" designates that a "1" is set in the working register (M) within each processing element (PEK). The "A=R1 (110)" indicates that one-bit data stored at the address "110 (H)" (initial address) of the register file (RF1) is input to the working register (A). "B=0" and "C=0" indicate that "0" and "0" are set in the working registers (B) and (C), respectively. "R0 (10)=SM" indicates that the sum of the arithmetic results output from the ALU (24) is stored at the address "10 (H)" (initial address) of the register file (RF0). In the arithmetic processing for the move instruction, the contents of the working register (A) are output unchanged as the arithmetic results of the ALU 24, and a carry bit (CY) is not generated.

The general configuration of a SIMD instruction of this embodiment, as was presented above defines an input value or input source for the working registers (M, A, B, C) within each processing element (PEK) before the transfer of the arithmetic results of the ALU 24, and the number of repetitions of the instruction.

Since it has been determined that the pertinent instruction (inst) at step (A4) is an SIMD instruction, next, the processing is conducted for steps (A5, A6). In this case, since it is an SIMD instruction, as mentioned above, the output of the AND gate 60 becomes a logical "0", and both switches 56, 58 are switched to their corresponding input terminals (a). Also, because the count value for the repeat counter (RPT CNTR) 52 is set to an initial value of "1," the output of the matching circuit 54 becomes a logical "1," and the signal for this logical "1" is provided as an input enable signal to the register 46 and the counters 48, 50, 52.

At step (A5), within the IG 14, the instruction codes (10 to 11, 22 to 39) of this instruction (inst) are set in the microinstruction register (INST REG) 46 by means of the switch 56 at the timing of the clock signal <PCLK>. Also, the addresses (0 to 9), (12 to 21) of this instruction (inst) are set at the timing of the clock signals <PCLK> in the address counters (RF0AD REG) 48, and (RF0AD REG) 50, respectively. Also, the repeat value (42 to 45) for this instruction (inst) is set at the timing of the clock signal <PCLK> in the repeat counter (RPT CNTR) 52. Because the repeat value (42 to 45) for this case is "8", the output of the matching circuit 54 is changed to a logical "0".

Within the SVP core 12, particularly in the processing unit 18, the arithmetic processing (step (B2) of FIG. 7) is executed according to the microinstruction <MICROINSTRUCTION> and the address <ADDRESS> that were respectively provided from the microinstruction register (INST REG) 46 and the address counters (RF0AD REG) 48, and (RF0AD REG) 50, respectively, of the IG 14. As a result, the one-bit data stored at the initial address "110 (H)" of the register file (RF1) is transferred to the initial address "10 (H)" of the register file (RF0) by means of the working register (A) and the ALU 24 within each processing element (PEK).

Next, at step (A6), the program counter (PC) 42 receives an increment enable signal of a logical "1" from the matching circuit 54, and increments by one the counter value (memory address). As a result, in this example, the count value (memory address of the program counter (PC) 42) is updated from "0" to "1."

The above-mentioned series of processes (A2 to A6) is conducted within the time of one clock cycle.

<<Clock Cycle 2>>

When process control enters the next (second) clock cycle, at step (A2), an instruction (inst) is read from the program memory 40 at the memory address "1" designated by the count value of the program counter (PC) 42.

Next, at step (A3), independent of the type of instruction read, it is determined whether or not the count value of the repeat counter (RPT CNTR) 52 is "1." In the case of this example, because the repeat count value at this point in time is "8", the output of the matching circuit 54 is "0", and is not "1." Due to this, the processes for steps (A7, A8) are selected.

At step (A7), within the IG 14, at the timing of the clock signal <PCLK>, along with the count values (address) for the address counters (RF0AD REG) 48, (RF0AD REG) 50 each being incremented by one, the count value (remaining repeat value) of the repeat counter (RPT CNTR) 52 is decremented by one to "7". The processing within this IG 14 is equivalent to the processing of step (B3) in FIG. 7.

Within the processing unit 18 of the SVP core 12, the arithmetic processing in units of one bit (step (B2) of FIG. 7) is executed according to the microinstruction <MICROINSTRUCTION> and the addresses <ADDRESS> that are respectively provided from the microinstruction register (INST REG) 46 and the address counters (RF0AD REG) 48 and (RF0AD REG) 50. As a result, the one-bit data stored in the next address "111 (H)" of the register file (RF1) after the initial address is transferred to the next address "11 (H)" after the initial address of the register file (RF0) by means of the working register (A) and the ALU 24 within each processing element (PEK).

Next, at step (A8), the inverter 64 and the AND gate 60 determine from the instruction type recognition data 40, 41 whether the current instruction (inst) read from the program memory 40 is an SIMD construction or an IG instruction.

The pertinent instruction (inst) in this example is a DINT (Disable Interrupt) that is classified as an IG instruction. Thus, process control enters step (A10), and the IG instruction execution unit 44 executes the DINT instruction. Since the DINT instruction disables hardware interrupts, this instruction advances process control to the instruction at the next memory address without branching, even if a hardware interrupt is generated. Therefore, by means of the execution of this DINT instruction, the count value (memory address) of the program counter 42 is incremented by 1 to "2".

The above-mentioned series of processes (A2 to A4 6 A7 to A8 6 A10) are conducted within the period of one clock cycle.

<<Clock Cycle 3>>

In the third clock cycle, because the count value (remaining repeat value) of the repeat counter (RPT CNTR) 52 is "7" (step (A3)), the processes of steps (A7, A8) are also selected.

At step (A7), within the IG 14, along with the count value (address) for the address counters (RF0AD REG) 48, (RF0AD REG) 50 each being incremented by one, the count value (remaining repeat value) of the repeat counter (RPT CNTR) 52 is decremented by one to "6". Also, in each processing element (PEK) of the processing unit (18), the one-bit data stored at the address "112 (H)" of the register file (RF1) is transferred to the address "12 (H)" of the register file (RF0) by means of the working register (A) and the ALU 24.

At the decision process of step (A8), because the instruction (inst) read from the program memory 40 at step (A2) is a JFAZ (Jump on Flag A Zero) at the memory address "2", the instruction is determined to be an IG instruction. In other words, the output of the AND gate 60 is "1."

Therefore, in this cycle also, process control enters step (A10), and the IG instruction execution unit 44 executes the JFAZ instruction. The JFAZ instruction polls the level of the flag signal <IGFLAG-A>, when that level is a logical "0", the memory address jumps to a prescribed branch address (in this example, "250"). In this example, it is assumed that this branch condition is not satisfied. In that case, the count value of the program counter 42 advances to the next memory address "3".

<<Clock Cycle 4>>

In the fourth clock cycle, because the count value (remaining repeat value) of the repeat counter (RPT CNTR) 52 is "6" (step (A3)), as expected, the processes of the steps (A7, A8) are selected.

In the process of step (A7), within the IG 14, along with the count value (address) for the address counters (RF0AD REG) 48, (RF0AD REG) 50 each being incremented by one, the count value (remaining repeat value) of the repeat counter (RPT CNTR) 52 is decremented by one to "5". In each processing element (PEK), the one-bit data stored at the address "113 (H)" of the register file (RF1) is transferred to the address "13 (H)" of the register file (RF0) by means of the working register (A) and the ALU 24.

In the decision process for step (A8), because the current instruction (inst) read from the program memory 40 is a JFBZ (Jump on Flag B Zero) instruction for the memory address "3", the instruction is determined to be an IG instruction.

Therefore, in this cycle also, process control enters step (A10), and the IG instruction execution unit 44 executes the JFBZ instruction. The JFBZ instruction polls the level of the flag signal <IGFLAG-B>, and when that level is a logical "0", the memory address jumps to a prescribed branch address (in this example, "60"). Here, it is assumed that this branch condition is not satisfied. Therefore, the count value of the program counter 42 is advanced to the next memory address "4".

<<Clock Cycle 5>>

In the fifth clock cycle, because the count value (remaining repeat value) of the repeat counter (RPT CNTR) is "5", as expected, the processes of step (A7, A8) are selected.

In the process of step (A7), within the IG 14, along with the count value (address) for the address counters (RF0AD REG) 48, (RF0AD REG) 50 each being incremented by one, the count value (remaining repeat value) of the repeat counter (RPT CNTR) 52 is decremented by one to "4". In each processing element (PEK), the one-bit data stored at the address "114 (H)" of the register file (RF1) is transferred to the address "14 (H)" of the register file (RF0) by means of the working register (A) and the ALU 24.

In the decision process of step (A8), the instruction (JMP (Jump) instruction at the memory address "4") read from the program memory 40 at step (A2) is determined to be an IG instruction.

In the processing for step (A10), the IG instruction execution unit 44 executes the JMP instruction, and the count value for the program counter 42 is updated to the target memory address (in this example, "10").

<<Clock Cycle 6>>

In the sixth clock cycle, at step (A2), the move instruction (FIG. 5) is read from the memory address "10" of the program memory 40. For clarity, the contents of the move operation of the memory address "10" are R1 [27 (H): 20 (H)] 7 R0 [127 (H): 120 (H)]. In other words, each processing element (PEK) transfers the eight-bit data set starting at the address "120 (H)" in the register file (RF0) over eight clock cycles one bit at a time to the starting address "20 (H)" in the register file (RF1).

In this case, at step (A3), because the count value (remaining repeat value) of the repeat counter (RPT CNTR) 52 is "4" (step (A3)), the processes of steps (A7, A8) are also selected.

In the process of step (A7), within the IG 14, along with the count value (address) for the address counters (RF0AD REG) 48, (RF0AD REG) 50 each being incremented by one, the count value (remaining repeat value) of the repeat counter (RPT CNTR) 52 is decremented by one to "3". In each processing element (PEK), the one-bit data stored at the address "115 (H)" of the register file (RF1) is transferred to the address "15 (H)" of the register file (RF0) by means of the working register (A) and the ALU 24.

In the decision process for step (A8), the instruction (move instruction for memory address "10") read from the program 40 is determined to be an SIMD instruction.

In this case, process control does not enter the step (A10), and this clock cycle is completed. Therefore, the count value of the program counter 42 is not updated, and the memory address "10" at the start of the clock cycle is maintained.

<<Clock Cycle 7>>

In the seventh clock cycle, in the same manner as in the previous cycle, the move instruction is read from the memory address "10" of the program memory 40 (step (A2)). Because the count value (remaining repeat value) of the repeat counter (RPT CNTR) 52 is still "3", in this case, the processes for steps (A7, A8) are also selected.

In the process of step (A7), within the IG 14, along with the count value (address) for the address counters (RF0AD REG) 48, (RF0AD REG) 50 each being incremented by one, the count value (remaining repeat value) of the repeat counter (RPT CNTR) 52 is decremented by one to "2". In each processing element (PEK), the one-bit data stored at the address "116 (H)" of the register file (RF1) transferred to the address "16 (H)" of the register file (RF0) by means of the working register (A) and the ALU 24.

In the decision process for step (A8), the instruction (move instruction for memory address "10") read from the program 40 is determined to be an SIMD instruction. Therefore, process control does not enter step (A10), the count value for the program counter 42 is maintained at "10", and this clock cycle is completed.

<<Clock Cycle 8>>

In the eighth clock cycle, in the same manner as in the previous cycle, the move instruction is read from the memory address "10" of the program memory 40 (step (A2)). Because the count value (remaining repeat value) of the repeat counter (RPT CNTR) 52 is still "2", in this case, the processes for steps (A7, A8) are also selected.

In the process of step (A7), within the IG 14, due to the fact that the count values (address) of the address counters (RF0AD REG) 48, (RF0AD REG) 50 are each incremented by one, within each processing element (PEK) of the SVP core 12, the one-bit data stored at the address "117(H)" of the register file (RF1) is transferred to the address "17(H)" of the register file (RF0) by means of the working register (A) and the ALU 24. The data move process for the eight bits designated by the move instruction (R0 [17(H): 10(H)] 7 R1 [117(H): 110(H)]) is completed. On the other band, the count value (remaining repeat value) of the repeat counter 52 of the IG 14 is decremented by one to "1." Due to this, the output of the matching circuit 54 is changed to a logical "1."

The output signal "1" from the matching circuit 54 is applied as an increment enable signal to the program counter 42 by means of the OR gate 62, and it is also applied as an input enable signal to the microinstruction register 46, the address counters 48, 50, and the repeat counter 52.

<<Clock Cycle 9>>

Also in the ninth clock cycle, the move instruction is read from the memory address "10" of the program memory (40) (step (A2)). However, at this time, since the count value of the repeat counter (RPT CNTR) 52 has become "1," process control enters step (A4), and recognition of the instruction type is conducted. In this case, because the move instruction is an SIMD instruction, process control enters step (A5).

At step (A5), within the IG 14, the instruction codes (10 to 11, 22 to 39) of the move instruction (inst) for the memory address "10" are loaded into the microinstruction register (INST REG) 46 by means of the changeover switch 56 at the timing of the clock pulse <PCLK>. Also, the addresses (0 to 9), (12 to 21) for this move instruction (inst) are set in the address counters (RFOAD REG) 48 and (RFOAD REG) 50, respectively, at the timing of the clock pulse <PCLK>. Also, the repeat value (42 to 45) of this move instruction (inst) is set in the repeat counter (RPT CNTR) 52 at the timing of the clock pulse <PCLK>. Because the repeat value (42 to 45) in this case is "8", the output of the matching circuit 54 is changed to a logical "0".

In the processing unit 18 of the SVP core 12, an arithmetic operation in units of one bit (step (B2) FIG. 7) is executed according to the microinstruction <MICROINSTRUCTION> and the addresses <ADDRESS> applied from the microinstruction register (INST REG) 46 and the address counters (RFOAD REG) 48 and (RFOAD REG) 50, respectively, of the IG 14. As a result, within each processing element (PEK), the one-bit data stored at the initial address "120 (H)" of the register file (RF0) is transferred to the initial address "20 (H)" of the register file (RF1) by means of the working register (A) and the ALU 24.

Next, at step (A6), the program counter (PC) 42 receives an increment enable signal of a logical "1" from the AND gate 60, and increments the count value (memory address) by one. As a result, in this example, the count value (memory address) of the program counter (PC) 42 is updated from "10" to "11"

<<Clock Cycle 10>>

In the 10th clock cycle, at step (A2), the JMP instruction is read from the memory address "11" of the program memory 40. At step (A3), because the count value (remaining repeat value) of the repeat counter (RPT CNTR) 52 is "8", in this case, the processes for steps (A7, A8) are also selected.

In the process of step (A7), within the IG 14, along with the count value (address) for the address counters (RFOAD REG) 48, (RFOAD REG) 50 each being incremented by one, the count value (remaining repeat value) of the repeat counter (RPT CNTR) 52 is decremented by one to "7". In each processing element (PEK), the one-bit data stored at the address "121 (H)" of the register file (RF1) is transferred to the address "21 (H)" of the register file (RF0) by means of the working register (A) and the ALU 24.

At step (A8), the instruction (the (JMP) instruction of the memory address "11") that was read from the program memory 40 at step (A2) is determined to be an IG instruction.

Next, at step (A10), the IG instruction execution unit 44 executes the JMP instruction, and the count value for the program counter 42 is updated at the target address (in this example, "5") that was designated by this JMP instruction.

<<Clock Cycle 11>>

During the 11th clock cycle, at step (A2), an add instruction is read from memory address "5" of the program memory 40. In the program of this example (FIG. 5), this designates an addition calculation where the contents of R1 [28 (H): 20 (H)] 7 R1 or [17 (H): 10 (H)]+R1 [27 (H): 20 (H)] across the three lines of the memory addresses "5, 6, 7," in other words, in each processing element (PEK), the eight bits of data that are stored in the address [17 (H): 10 (H)] of the register file (RF0) are added to the eight bits of data that are stored at the address [27 (H): 20 (H)] of the register file (RF 1), and the addition result of nine bits including the carry out of the most significant bit is stored at the address [28 (H): 20 (H)] of the register file (RF1).

The add instruction of the memory address "5" designates the addition calculation for the least significant bit. More specifically, "RPT=1" designates the fact that the number of repetitions of this addition calculation is one. "M=1" designates the fact that a "1" is set in the working register (M) within each processing element (PEK). "A=R0 (10)" designates the fact that one-bit data that is stored at the address "10 (H)" of the register file (RF0) is provided to the working register (A). "B=R1 (20)" designates the fact that the one-bit data that is stored at the address "20 (H)" of the register file (RF1) is provided to the working register (B). "C=0" designates the fact that a "0" is set in the working register (C). "R1 (20)=SM" designates the fact that the sum (SM) of the addition results that are output from the ALU 24 are stored at the address "20 (H)" of the register file (RF1).

At step (A3), because the count value (remaining repeat value) of the repeat counter (RPT CNTR) 52 is "7," the processes of steps (A7, A8) are selected.

In the process of step (A7), within the IG 14, along with the count value (address) for the address counters (RFOAD REG) 48, (RFOAD REG) 50 being respectively incremented by one, the count value (remaining repeat value) of the repeat counter (RPT CNTR) 52 is decremented by one and becomes "6." In each processing element (PEK), the one-bit data that is stored at the address "122 (H)" of the register file (RF1) is transferred to the address "22 (H)" of the register file (RF0) by means of the working register (A) and the ALU 24.

In the decision process of step (A8), it is determined that the instruction (the add instruction for the memory address "5") that was read from the program memory 40 is an SIMD instruction. Consequently, process control does not go to step (A10), the count value of the program counter 42 is unchanged, and the clock cycle is completed.

<<Clock Cycles 12 to 15>>

During each of the 12th to 15th clock cycles, the above-mentioned add instruction is read from the memory address "5" of the program memory 40 at step (A2), and the processes for steps (A7, A8) are selected by means of the decision of step (A3).

In the process of step (A7), within the IG 14, along with the count value (address) for the address counters (RFOAD REG) 48, (RFOAD REG) 50 being respectively incremented by one in each cycle, the count value (remaining repeat value) of the repeat counter (RPT CNTR) 52 is decremented by one at each cycle and is changed to "5", "4", "3", "2". In each processing element (PEK) of the processing unit 18, the one-bit data that is stored at the addresses "123 (H)" to "126 (H)" of the register file (RF1) is transferred to the addresses "23 (H)" to "26 (H)" of the register file (RF0) by means of the working register (A) and the ALU 24.

Because the instruction (an instruction for memory address "5") that is read from the program memory 40 at each of the clock cycles is an SIMD instruction, process control does not enter step (A10) from step (A8), the count value of the program counter 42 is maintained at "5," and each clock cycle is completed.

<<Clock Cycle 16>>

During the 16th clock cycle, at step (A2), the above-mentioned add instruction is read from the memory address "5" of the program memory 40. At step (A3), because the count value (remaining repeat value) of the repeat counter (RPT CNTR) 52 is "2," in this case also, the processes of steps (A7, A8) are selected.

In the process of step (A7), within the IG 14, due to the fact that the addresses <ADDRESS> from the address counters (RFOAD REG) 48 and (RFOAD REG) 50 are respectively incremented by one, in each processing element (PEK) of the processing unit 18, the one-bit data that is stored at the address "127 (H)" of the register file (RF1) is transferred to the address "27 (H)" of the register file (RF0) by means of the working register (A) and the ALU 24. Thus, the data move process for the eight bits (R1 [27 (H): 20 (H)] 7 R0 [127 (H): 120 (H)]) which the move instruction designated this time is completed. Hence, the output of the matching circuit 54 is a logical "1".

The logical "1" output signal of the matching circuit 54, along with being provided as an increment enable signal to the program counter 42 by means of the OR gate 62, is provided as an input enable signal to the microinstruction register 46, the address counters 48, 50, and the repeat counter 52.

Next, process control does not enter step (A10) from step (A8), the count value of the program counter 42 is maintained "5," and the program cycle is completed.

<<Clock Cycle 17>>

During the 17th clock cycle also, the add instruction of the memory address "5" in the program memory 40 is read (step (A2)). However, this time, since the count value of the repeat counter (RPT CNTR) 52 has become "1," process control enters step (A4), and the recognition of the instruction configuration is conducted. In this case, because the move instruction is an SIMD instruction, it enters the process for step (A5).

At step (A5), within the IG 14, the instruction code sections (10 to 11, 22 to 39) of the add instruction (inst) of the memory address "5" is set in the microinstruction register (INST REG) 46 with the timing of the clock <PCLK> by means of the changeover switch 56. Also, the address sections (0 to 9) and (12 to 21) of this add instruction (inst) are respectively set in the address counters (RFOAD REG) 48 and (RFOAD REG) 50 with the timing of the clock <PCLK>. Also, the repeat value (42 to 45) of this add instruction (inst) is set in the repeat counter (RPT CNTR) 52 with the timing of the clock <PCLK>. Because the repeat value (42 to 45) at this time is "1," the output of the matching circuit 54 is left as a logical "1."

In the processing unit 18 of the SVP core 12, the addition process (step (Cl) FIG. 8) for one bit units are executed according to the microinstructions <MICROINSTRUCTION> and the addresses <ADDRESS> that are respectively provided from the microinstruction register (INST REG) 46 and the address counters (RFOAD REG) 48 and (RFOAD REG) 50. As a result, within each processing element (PEK), the one-bit data that is stored at the address "10 (H)" of the register file (RF0) and the one-bit data that is stored at the address "20 (H)" of the register file (RF1) are added by the ALU 24, and the sum (SM) of that addition result is written at the address "20 (H)" of the register file (RF1).

Next, at step (A6), the program counter (PC) 42 receives the increment enable signal of a logical "1" from the matching circuit 54, and the count value (memory address) is incremented by one. As a result, in this example, the count value (memory address) of the program counter (PC) 42 is changed from "5" to "6."

<<Clock Cycle 18>>

During the 18th clock cycle, the add instruction for memory address "6" in the program memory 42 is read (step (A2)). The add instruction for this memory address "6" designates the above-mentioned add calculation except the least significant bit within the [register] (R1 [28 (H): 20 (H)] 7 R0 [17 (H): 10 (H)]+R1 [27 (H): 20 (H)]) and the most significant seven bits of the add calculation (R1 [27 (H): 21 (H)] 7 R0 [17 (H): 11 (H)]+R1 [27 (H): 21 (H)]). The difference between add this instruction and that of the above-mentioned memory address "5" is the fact that the number of one-bit additions, in other words, the value for the number of times of instruction repetition (RPT), and the carry (CY) that is output from the ALU 24 at the immediately preceding cycle are input into the working register (C).

At step (A3), since the count value for the repeat counter (RPT CNTR) 52 becomes "1," step (A4) is selected. At step (A4), because the add instruction of the memory address "6" is an SIMD instruction, the processes of steps (A5, A6) are selected.

At step (A5), within the IG 14, the instruction code sections (10 to 11, 22 to 39) of the add instruction (inst) of the memory address "6" are set in the microinstruction register (INST REG) 46 at the timing of the clock <PCLK> by means of the changeover switch 56. Also, the address section (0 to 9) and (12 to 21) of this add instruction (inst) are respectively set in the address counters (RFOAD REG) 48 and (RFOAD REG) 50 at the timing of the clock <PCLK>.

Also, the repeat value (42 to 45) of this add instruction (inst) is set in the repeat counter (RPT CNTR) 52 at the timing of the clock <PCLK>. Because the repeat value (42 to 45) for this time is "7," the output of the matching circuit 54 is changed to a logical "0." The process within the IG 14 and step (A5) is equivalent to step (C2) of FIG. 8.

In the processing unit 18, the addition process (step (C3) FIG. 8) in one bit units are executed according to the microinstructions <MICROINSTRUCTION> and the addresses <ADDRESS> that are respectively provided from the microinstruction register (INST REG) 46 and the address counters (RFOAD REG) 48 and (RFOAD REG) 50. As a result of this, within each processing element (PEK), the one-bit data that is stored at the address "11(H)" of the register file (RF0) and the one-bit data that is stored at the address "21 (H)" of the register file (RF1) are added at the ALU 24, and the sum (SM) is written to the address "21 (H)" of the register file (RF1).

Next, at step (A6), the count value (memory address) of the program counter (PC) 42 is incremented by one, to "7."

<<Clock Cycles 19 to 23>>

In each of the 19th to 23rd cycles, the add instruction for the memory address "7" in the program memory 41 is read (step (A2). Appropriately, at step (A3), the count value of the repeat counter (RPT CNTR) 52 is changed from "6" to "3", and because it still has not reached "1," the processes for steps (A7, A8) which are unrelated to the type of the instruction are selected.

In the process of step (A7), within the IG (14), along with the counter value (address) for the address counters (RFOAD REG) 48, (RFOAD REG) 50 being respectively incremented by one at each cycle, the count value (remaining repeat value) of the repeat counter (RPT CNTR) 52 is decremented by one at each cycle and is changed to "5," "4," "3," "2". In each processing element (PEK), the data that are stored at the addresses "12 to 16 (H)" of the register file (RF0) and the data of the addresses "22 to 26 (H)" of the register file (RF1) are added at the ALU 24 (step (C3) of FIG. 8), and the sum (SM) is written at the addresses (22 to 26 (H)" of the register file (RF1).

Because the instruction (add instruction of memory address "7") that is read from the program memory 40 at each clock cycle is an SIMD instruction, without entering step (A10) from step (A8), the count value of the program counter 42 is maintained at "7," and each clock cycle is completed.

<<Clock Cycle 24>>

During the 24th clock cycle also, the add instruction of the memory address "7" in the program memory 40 is read (step (A2)). At step (A3), because the count value (remaining repeat value) of the repeat counter (RPT CNTR) 52 is "2," in this case also, the processes of steps (A7, A8) are selected.

At step (A7), due to the fact that the addresses <ADDRESS> that are respectively provided from the address counters (RFOAD RAID) 48 and (RFOAD RAID) 50 of the IG 14 are incremented by 1, within each processing element (PEK) of the SVP core 12, one-bit data that is stored at the address "17 (H)" of the register file (RF0) and the one-bit data and that is stored at the address "27 (H)" of the register file (RF1) are added by the ALU 24, and the sum (SM) is written to the address "27 (H)" of the register file (RF1). Thus, the process for the addition calculation (R1 [27 (H): 21 (H)] 7 R0 [17 (H): 11 (H)]+R1 [27 (H): 21 (H)]) for the most significant 7 bits which the add instruction of the memory address "6" has designated is completed. On the other hand, the count value (remaining repeat value) of the repeat counter 52 of the IG 54 is decremented by one and becomes "1." Hence, the output of the matching circuit 54 becomes a logical "1."

The logical "1" output signal from the matching circuit 54, along with being provided as an increment enable signal to the program counter 42 by means of the OR gate 62, is provided as an input enable signal to the microinstruction register 46, the address counters 48, 50, and the repeat counter 52.

From step (A8), process control does not enter step (A10), the count value of the program counter 42 is maintained at "7," and this cycle is completed.

<<Clock Cycle 25>>

At the 25th clock cycle, the add instruction of the memory address "7" in the program memory 40 is read (step (A2)). The add instruction of this memory address "7" designates calculations for the purpose of including in the addition calculation results of the carry (CY) for the addition results for the most significant bit within the above-mentioned 8-bit addition results (R1 [28 (H): 20 (H)] 7 R0 [17 (H): 10 (H)]+R1 [27 (H): 20 (H)]). For this purpose, the number of repetitions (RPT) of the add calculation is made one (cycle), and along with setting "0" in the respective working registers (A) and (B), in the working register (C), the setting of the carry "CY" that was output immediately before from the ALU 24 is designated.

At step (A3), since the count value for the repeat counter (RPT CNTR) 52 is "1," step (A4) is selected. At step (A4), because the add instruction of the memory address "7" is an SIMD instruction, the processes of steps (A5, A6) are selected.

At step (A5), within the ID 14, the instruction code sections (10 to 11, 22 to 39) of the add instruction (inst) of the memory address "7" are set in the microinstruction register (INST REG) 46 by means of the changeover switch 56 at the timing of the clock <PCLK>. Also, the address sections (0 to 9) and (12 to 21) of this add instruction (inst) are respectively set in the address counters (RFOAD REG) 48 and (RFOAD REG) 50 at the timing of the clock <PCLK>. Also, the repeat value (42 to 45) for this add instruction is set in the repeat center (RPT CNTR) 52 at the timing of the clock <PCLK>. Because the repeat value (42 to 45) for this time is "1," the output of the matching circuit 54 is left as a logical "1."

In the processing unit 18, the addition process (step (C6) FIG. 8) in one-bit units is executed according to the microinstruction <MICROINSTRUCTION> and the addresses <ADDRESS> that are respectively provided from the microinstruction register (INST REG) 46 and the address counters (RFOAD REG) 48 and (RFOAD REG) 50. As a result of this, within each processing element (PEK), the carry (CY) that was output immediately before from the ALU 24 becomes the sum (SM) for the calculation results of the ALU 24 as is, and is written in the address "28 (H)" of the register file (RF1). Thus, the entire calculation processes for the addition calculation (R1 [28 (H): 20 (H)] 7 R0 [17 (H): 10(H)]+R1 [27 (H): 20 (H)]) for the 8-bit data groups that the add instructions of the memory addresses "5, 6, 7" designated are completed.

Next, at step (A6), the program counter (PC) 42 increments the counter value (memory address) by one, to "8."
<<Clock Cycle 26>>

At the next (26th) clock cycle, at step (A2), the EINT (Enable Interrupt) instruction is read from the memory address "8" of the program memory 40. Next, at step (A3), since the count value of the repeat counter (RPT CNTR) 52 has become "1," step (A4) is selected. At step (A4), since the EINT instruction is an IG instruction, the processes of steps (A9, A10) are selected. In other words, a logical "1" input enable signal from the matching circuit 54 is provided to the microinstruction register 46 and the repeat counter 52, and by means of the logical "1" output from the AND gate 60, a condition in which the switches 56, 58 are respectively switched to the input terminal (a) is established, and the processes for the steps (A9, A10) are conducted.

At step (A9), within the IG 14, the NOP code <NOP> and the remaining repeat value <1> are respectively loaded in the microinstruction register 46 and the repeat counter 52 by means of the switches 56, 58 at the timing of the clock <PCLK>. Within the processing unit 18 of the SVP core 12, because a NOP code <NOP> that designates no operation instruction is provided from the microinstruction register (INST REG) 46, each processing element (PEK) suspend operation. During a NOP instruction, the addresses <ADDRESS> in the address counters (RFOAD REG) 48 and (RFOAD REG) 50 are not used.

At step (A10), the IG instruction execution unit 44 within the IG 14 executes the EINT instruction. The EINT instruction, in the event that a hardware interrupt is generated, indicates the fact that process control has jumped to a prescribed target. Here, it is assumed that a hardware interrupt has not been generated. Therefore, due to the execution of this EINT instruction, the count value (memory address) of the program counter 42 is incremented by one, and becomes "9."
<<Clock Cycle 27>>

In the next 27 clock cycle, at step (A2), the JMP instruction is read from the memory address "9" of the program memory 40. At step (A3), since the count value of the repeat counter (RPT CNTR) 52 has become "1," step (A4) is selected. At step (A4), since the JMP instruction is an IG instruction, the processes of steps (A9, A10) are selected.

At step (A9), a <NOP> instruction is performed in the same manner as in the above-mentioned 26th clock cycle. At step (A10), the IG instruction execution unit 44 executes the JMP instruction, and the count value (memory address) of the program counter 42 is updated to the designated target "0."

This target memory address "0" is the header address for the program (FIG. 5) of this example, and moreover, at this point in time, does not mean that a given SIMD instruction has become pending (the repetition for a prescribed number of times is not completed). Therefore, in the following 28th clock cycle and thereafter, the operation is repeated in the same manner as described above (<<Clock Cycles 1 to 27>>).

In this way, in the SVP 10 of this embodiment, when an IG instruction is read from the program memory 40 in the middle of a repetition process that is being conducted for an SIMD instruction at the SVP core 12, since it is made to execute the pertinent IG instruction in parallel with the repetition process for the pertinent SIMD instruction, the throughput can be significantly increased.

For example, in the above-mentioned program example, during the period for the <<Clock Cycles 1 to 8>>, each processing element (PEK) of the SVP core 12 is repetitively executed one bit at a time for each clock cycle of the move instruction (R0 [17 (H): 10 (H)]←R1 [117 (H): 110 (H)]) for the memory address "0" that is categorized as an SIMD instruction. On the other hand, within the IG 14, taking the <<Clock Cycles 2 to 5>> within this period, the DINT instruction, the JFAZ instruction, the JFBZ instruction, and the JMP instruction (all of which are IG instructions) that were read from the program memory 40 are executed one after another by the IG instruction execution unit 44.Thus, after all of the processes for the above-mentioned move instruction have been completed, at the next <<Clock Cycle 9>> the SVP core (12) side can start the process for the move instruction (R1 [27 (H): 20 (H)]←R0 [127 (H): 120 (H)]) of the memory address "10" that was designated by the above-mentioned JMP instruction.

If it is the SVP of this type that was used in the past, the DINT instruction, which was the next instruction, was made to wait until the process for the move instruction (R1 [17 (H): 10 (H)]←R1 [117 (H): 110 (H)]) of the memory address "0" at the SVP core 12 side was completed. Then, after the completion of said move instruction, said DINT instruction of the memory address "1" was executed at <<Clock Cycle 9>>. Next, in the above-mentioned example, the above-mentioned JFAZ instruction of the memory address "2" was executed at <<Clock Cycle 10>>, the above-mentioned JFBZ instruction of the memory address "3" was executed at <<Clock Cycle 11>>, and the above-mentioned JMP instruction of the memory address "4" was sequentially executed at <<Clock Cycle 12>>. In this way, during the continuous period <<Clock Cycles 9 to 12>> for the execution of the IG instructions, the SVP core 12 provided the NOP code <NOP>, and the no operation state resulted. The time at which the processing of the SVP core 12 restarted was after <<Clock Cycle 13>>, and compared to this embodiment, brought about a delay of four clock cycles.

Figure 9:
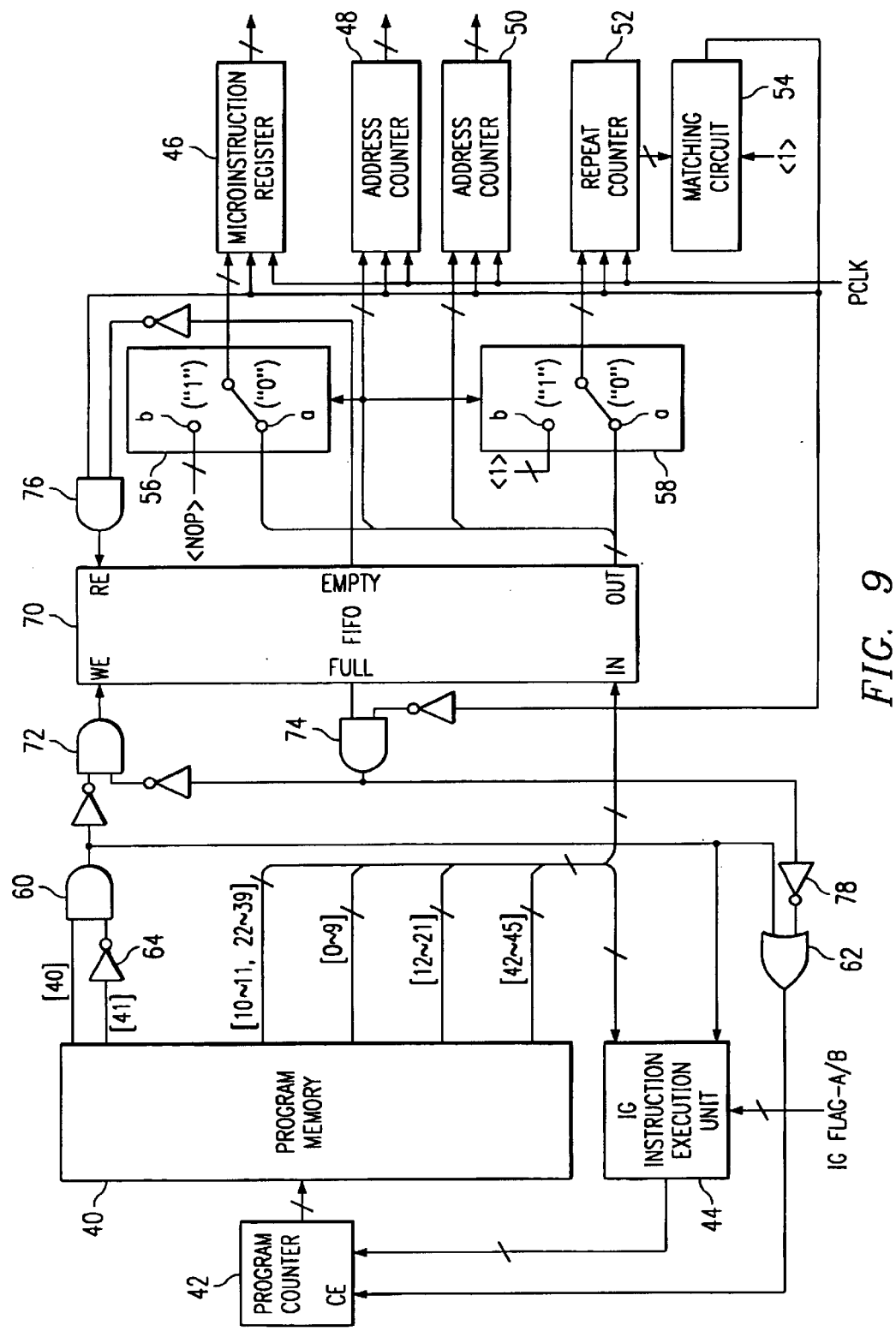
FIG. 9 is a block diagram showing the construction of the essential portions of an instruction generator (IG) in Embodiment 2.

In FIG. 9, the construction of the essential parts of the IG 14 in Embodiment 2 of the present invention is shown. This Embodiment 2 is mainly characterized in that in the IG 14 of the above-mentioned Embodiment 1, between the program memory 40 and the microinstruction register 46, the address counters 48, 50, and the repeat counter 52, a FIFO (First in, First out) memory 70 is provided as a buffer memory used for SIMD instructions.

The FIFO memory 70 has a data input terminal (IN), a data output terminal (OUT), a write enable terminal (WE), a read enable terminal (RE), a full condition terminal (full) and an empty condition terminal (empty), and, except for the instruction configuration recognition data 40, 41, of the 46 bits of program data (0 to 45) that are read from the program memory 40, it temporarily stores 44 bits of data (0 to 39, 42 to 45) by the first in, first out method to the prescribed depth (the maximum number of stored data).

As for the conditions for the purpose of inputting the data (0 to 39, 42 to 45) that are read from the program memory 40 into this FIFO memory 70, both outputs of the AND gates 60, 74 are logical "0," and a logical "1" is output the AND gate 74 to the write enable terminal (WE).

As was mentioned above, the AND gate 60 outputs a "1" when the instruction recognition data 40, 41 for the pertinent instruction that is read from the program memory 40 are (0, 0), in other words, when the pertinent instruction is an SIMD instruction.

The AND gate 72 outputs a "0", (1) when the full condition terminal (full) of the FIFO memory 70 is a logical value "0," in other words, when the memory 70 is not full, or (2) when the output of the matching circuit 54 is a logical "1," in other words, when the remaining repeat value for the repeat counter 52 is "1." In the case of (2), as will be explained below, data read becomes possible, and because the data header is output from the data output terminal (A), it becomes possible to input (write) data to the data input terminal (IN) in its place.

The condition for outputting the header data from the stored data in FIFO memory 70 is outputting logical "1" from AND gate 76 to the read enable terminal (RE). The output of the AND gate 76 is "1" when the empty state terminal (empty) is a logical "0," in other words, memory 70 is in the empty state, and also when the output of the matching circuit 54 is a logical "1," in other words, when the remaining repeat value for the repeat counter 52 is "1."

In FIG. 10, the routine for the program execution process in this Embodiment 2 is shown.

In the initialization, in addition to setting the count value for the program counter (PC) 42 and the repeat counter (RPT CNTR) 52 to the initial values of "0" and "1," respectively, the FIFO memory 70 is placed in the empty state (step (D1)).

In each program file during the program execution, first, at step (D2), the instruction (inst) is read from the program memory 40 at the memory address that is designated by the counter value of the program. Next, at step (D3), the counter value (remaining repeat value) for the repeat counter (RPT CNTR) 52 is determined, and when it is "1," at the next step (D4), the process is known depending on whether or not the FIFO memory 70 is in the empty condition.

When the FIFO memory 70 is in the empty condition, in other words, when the empty condition terminal (empty) is "1," the process of step (D5) is selected. In this case, because the switches 56, 58 are respectively switched to the terminal (b), along with the NOP code <NOP> being set in the microinstruction register 46, the remaining repeat value <1> is set in the repeat counter 52. By this means, in the processing unit 18 of the SVP core 12, the processing element (PEK) does not perform any processes whatsoever, and the operation is suspended.

When the FIFO memory 70 is not in the empty state at step (D4), the process of step (D6) is selected. In this case, the empty condition terminal (empty) is "0," and the switches 56, 58 are respectively switched to the terminal (a). Also, because the output of the matching circuit 52 [sic; 54] is "1," a "1" is read from the output terminal of the AND gate 76, and applied to the read enable terminal (RE). Then, of the data (0 to 39, 42 to 45) that are read from the data output terminal (OUT) of the FIFO memory 70, the SLMD instruction code sections (10 to 11, 22 to 39) are set in the microinstruction register 46 by means of the switch 56, the addresses (0 to 9) and (12 to 21) are respectively set in the address counters 48, 50, and the repeat value (42 to 45) is set in the repeat counter by means of the switch 58.

Next, at step (D8), it is determined whether the pertinent instruction that was read from the program memory 40 is an IG instruction, or an SIMD instruction. In other words, the process routine is known according to the value of the output of the AND gate 60.

When the output of the AND gate 60 is "1" (when it is an IG instruction), the IG instruction execution unit 44 executes the pertinent instruction at step (D9). At this time, the output of the AND gate 72 is "0", and the FIFO memory 70 is made to inhibit data input.

When the output of the AND gate 60 is "0" (when it is an SIMD instruction), the output of the AND gate 72 is "1," and data can be written to the FIFO memory 70, at step (D11), data (0 to 39, 42 to 45) besides instruction configuration recognition data (40, 41) of the pertinent SIMD instruction is input to the data input terminal (IN).

On the other hand, because the output of the AND gate 74 is "0," the output of the inverter 78, and by extension, the output of the OR gate 62, becomes "1," this "1" signal is applied to the program counter 42 as an increment enable signal, and the memory address is incremented by one (step (D12)).

At step (D3), when the counter value (remaining repeat value) of the repeat counter (RPT CNTR) 52 has not yet become "1," in other words, when the SIMD instruction at the processing unit 18 of the SVP core 12 has not yet been executed the required number of times, the process for step (D7) is selected. At this step (D7) and the following steps (D8, D9), it becomes process content that is the same as in the steps (A7, A8, A10) in the above-mentioned Embodiment 1.

In other words, at step (D7), within the IG 14, at the timing of the clock <PCLK>, along with the counter value of the address counters (RFOAD REG) 48 and (RFOAD REG) 50 being respectively incremented by one, the counter value (remaining repeat value) of the repeat counter (RPT CNTR) 52 is decremented by one. Within the processing unit 18 of the SVP core 12, the arithmetic processes are executed in one bit units according to the microinstruction <MICROINSTRUCTION> and the addresses <ADDRESS> that are respectively provided from the microinstruction register (INST REG) 46 and the address counters (RFOAD REG) 48 and (RFOAD REG) 50 of the IG 14. Next, at step (D8), it is determined whether the instruction that was read from the program memory 40 at step (D) is an SIMD instruction or an IG instruction. When it is an IG instruction, next, at step (D9), said IG instruction is executed by means of the IG instruction execution unit 44.

However, when it is an SIMD instruction, unlike the above-mentioned Embodiment 1 (said clock cycle is not ended), process control goes to step (D10). Then, unless the FIFO memory 70 is full, the data (0 to 39, 42 to 45) other than the instruction configuration recognition data 40, 41 for said SIMD instruction are input to the FIFO memory 70 (step (D11)), and the counter value (memory address) of the program counter 42 is incremented by one (step (D12)).

In this way, in this Embodiment 2, in the processing unit 18, when another SIMD instruction is read from the program memory 40 before the repetitive execution processes are completed for a given SIMD instruction, the latter SIMD instruction is stored in the FIFO memory 70 within the permissible storage capacity of the FIFO memory 70 at that time, and process control advances to the next memory address. Therefore, when an IG instruction is read from the program memory at the next memory address, since said IG instruction can be executed in parallel with the repetitive execution of the SIMD instruction, the throughput can be increased.

In FIG. 11 and FIG. 12, the status and the operation are shown for each section at each clock cycle in the case of executing the program example of FIG. 5 with the SVP 10 by means of this Embodiment 2.

In the initial clock cycle, the processes for steps (D2→D3→D4→D5→D8→D11→D12) are conducted. In particular, at step (D11), the move instruction (correctly stated, the instruction code section and address for this move instruction) of the memory address "0" that is read from the program memory 40 is stored in the FIFO memory 70. At step (D5), operation of processing unit 18 is suspended because the NOP instruction <NOP> is applied.

During the second clock cycle, the processes of the steps (D2→D3→D4→D6→D8→D9) are conducted. In particular, at step (D6), the instruction code section and the address for the above-mentioned move instruction are read from the FIFO memory 70, and respectively input in the microinstruction register 46 and the address counters 48, 50; each processing element (PEK) of the processing unit 18 executes the above-mentioned move instruction (the first time). At step (D9), the IG instruction execution unit 44 executes the DINT instruction of the memory address "1" that was read from the program memory 40.

During the third to fifth clock cycles, the processes of the steps (D2→D3→D7→D8→D9) are selected, and the same type of process operations are conducted as in the third to fifth clock cycles of the above-mentioned Embodiment 1. In other words, each processing element (PEK) of the processing unit 18 sequentially executes the above-mentioned move instruction for the second, third, and fourth time, and at the same time, the IG instruction execution unit 44 sequentially executes the DINT instruction, the JFAZ instruction, and the JFBZ instruction of the memory addresses "2," "3," and "4" that were read from the program memory 40.

During the sixth clock cycle, the processes of the steps (D2→D3→D7→D8→D10→D11→D12) are conducted. In particular, at step (D11), the move instruction of the memory address "10" that was read from the program memory 40 is stored in the FIFO memory 70. Then, at step (D12), the counter value (memory address) of the address counter (PC) 42 is incremented and becomes "11".

During the seventh clock cycle, the processes of the steps (D2→D3→D7→D8→D9) are conducted. At step (D9), the IG instruction execution unit 44 executes the JMP instruction of the memory address 11 that was read from the program memory 40. In contrast to the fact that, in the above-mentioned Embodiment 1, the JMP instruction of the memory address "11" was executed at the 10th clock cycle, in this embodiment, the same JMP instruction is executed at the seventh clock cycle.

During the eighth clock cycle, the processes of the steps (D2→D3→D7→D8→D10→D11→D12) are conducted. In particular, at step (D11), the add instruction of the memory address "5" that was read from the program memory 40 is stored in the FIFO memory 70.

During the ninth clock cycle, the processes of the steps (D2→D3→D7→D8→D10) (end) are conducted. At step (D10), because the FIFO memory 7 is full, the add instruction of the memory address "6" that was read from the program memory 40 is not stored in the FIFO memory 70. Therefore, the counter value (memory address) of the address counter (PC) 42 remains at "6." However, at step (D7), the repetitive execution operation of the processing unit 18 for the move instruction of the memory address "0" is completed, and the counter value (remaining repeat value) of the repeat counter (RPT CNTR ) becomes "1."

During the 10th clock cycle, the processes for the steps (D2→D3→D4→D6→D8→D11→D12) are conducted. At step (D6), the move instruction of the memory address "10" is read from the FIFO memory 70, and set in the microinstruction register 46 and the address counters 48, 50, and each processing element (PEK) of the processing unit 18 executes the above-mentioned move instruction (the first time). At step (D11), in place of the above-mentioned move instruction, this time the add instruction of the memory address "6" that was read from the program memory 40 is stored in the FIFO memory 70.

During the 11th to 17th clock cycles, the processes of the steps (D2→D3→D7→D8→D10 (end)) are conducted.

During the 18th clock cycle, the processes for steps (D2→D3→D4→D6→D8→D10→D11→D12) are selected. At step (D6), the add instruction of the memory address "5" is read from the FIFO memory 70, set in the microinstruction register 46 and the address counters 48, 50, and each processing element (PEK) of the processing unit 18 executes the above-mentioned add instruction. At step (D11), in place of the above-mentioned add instruction of the memory address "5," this time the add instruction of the memory address "7" that was read from the program memory 40 is stored in the FIFO memory 70.

During the 19th clock cycle, the processes for the steps (D2→D3→D4→D6→D8→D9) are conducted. At step (D6), the add instruction of the memory address "6" is read from the FIFO memory 70 and set in the microinstruction register 46 and the address counters 48, 50, and each processing element (PEK) of the processing unit 18 executes the above-mentioned add instruction. At step (D9), the IG instruction execution unit 44 executes the EINT instruction of the memory address "8" that was read from the program memory 40.

During the 20th clock cycle, the processes for the steps (D2→D3→D7→D8→D9) are conducted. At step (D7), each processing element (PEK) of the processing unit 18 executes the add instruction for the second time for the add instruction of the memory address "6."

In contrast to the fact that, in the above-mentioned Embodiment 1, in the 26th and 27 clock cycles, the. EINT instruction and the JMP instruction of the memory addresses "8" and "9" are executed, in this embodiment, the same instructions are executed during the 19th and 20th clock cycles. Moreover, at the time the IG instruction execution unit 44 executes these EINT instructions and JMP instructions, in contrast to the fact that in the Embodiment 1 the processing unit 18 receives a NOP instruction and its operation is suspended, in this embodiment, the processing unit 18 receives the microinstruction and addresses from the microinstruction register 46 and the address counters 48, 50, and continues the repetitive execution of the SIMD instruction (the add instruction of the memory address "6"). By this means, the operating efficiency of the processing unit 18 is improved further.

Since the operations in the 21st and following clock cycles can be easily understood from the above-mentioned explanations and FIG. 12, their explanation are omitted.

Figure 13:
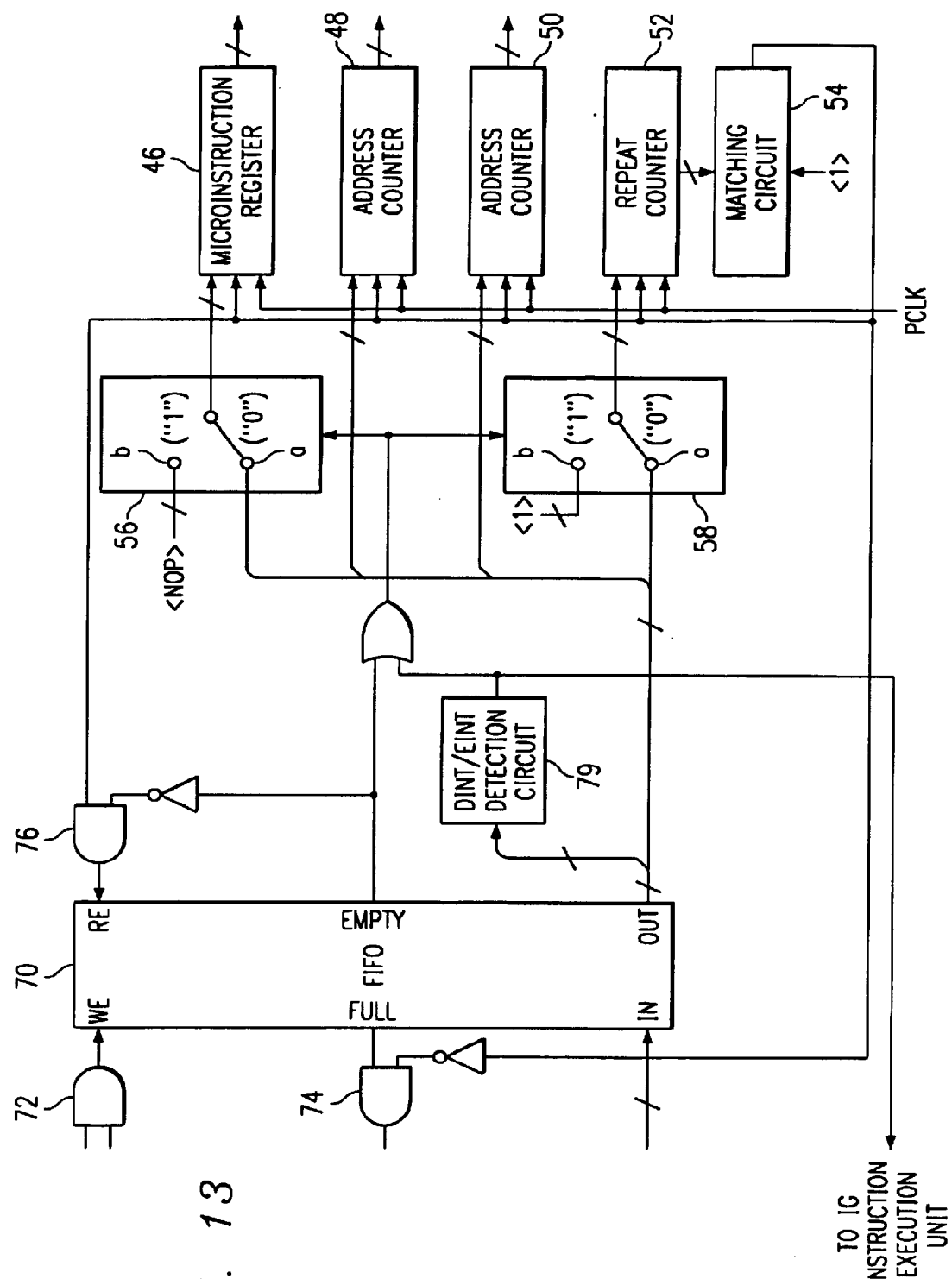
FIG. 13 is a block diagram showing the design of the essential sections of a modified example that executes the synchronous type of non-SIMD instructions (DINT, EINT) synchronized with the SIMD instruction in Embodiment 2.

Even with non-SIMD instructions, there are instances in which adopting a method of synchronizing with the execution sequence for an SIMD instruction is preferable. For example, in the DINT instruction (interrupt disable instruction) and the EINT instruction (interrupt enable instruction), there are instances in which the step for the timing that determines the presence or absence of a hardware interrupt is synchronized with the execution sequence for an SIMD instruction. In this case, this type of a synchronous non-SIMD instruction (DINT, EINT) is stored once in the FIFO memory 70, and is read from the FIFO memory 70 when detection and execution of said non-SIMD instruction is to be conducted. In this application, as is shown in FIG. 13, the circuit 79 is provided that detects the non-SIMD instructions (DINT, EINT) from the data that are read from the data output terminal (OUT) of the FIFO MEMORY 70, and transfers them to the IG instruction execution unit 44.

In FIG. 14, an embodiment is shown that reduces the required memory capacity of the program memory 40 in the present invention. The program necessary for the processing operations of this SVP 10 is stored in program memory 40. As was mentioned above, the individual instructions (program data) that make up the program comprise, for example, 46 bits (0 to 45), and of these, two bits of data (40, 41) show the configuration of the pertinent instruction, in other words, whether it is an SIMD instruction or an IG instruction. Then, in the case of an SIMD instruction, 10 bits of data each (0 to 9) and (12 to 21) respectively dictate the initial address within the register files (RF0, RF1) in each processing element (PEK), 20 bits of data (10 to 11, 22 to 39) indicate the instruction code section for the given SIMD instruction, and four bits of data (42 to 45) indicate the repeat value (number of repetitions) of the given SLMD instruction.

Because the instruction code sections (10 to 11, 22 to 39) are provided as is to the SVP core 12 as a microinstruction, it has a data length of 20 bits. In the case of 20-bit data, a data value equal to $2^{20}$ (=1048574) is possible. However, in an actual SVP, there are usually less than 200 types of instructions.

In light of the foregoing, in this embodiment, data in which the instruction code sections (10 to 11, 22 to 39) are encoded, for example, into eight bits of data (d0 to d7), are stored in program memory 40, each code data (d0 to d7) of the eight bits that are read from program memory 40 are expanded (decoded) to 20 bits of data by the decoder 80, i.e., to the original instruction code sections (10 to 11, 22 to 39). The decoder 80 can be realized as a ROM or RAM lookup table. In program memory 40, because the instruction code section for each instruction is eight bits wide, the required memory capacity can be made much smaller than 20 bits wide.

As for the decoder 80, the sharing with the SIMD instruction execution unit and the IG instruction execution unit is also possible, or they can be separately provided. In the latter case, in the SIMD instruction execution unit, the decoder 80 can be arranged at the last stage of the microinstruction register 46. By this means, the bit width for the microinstruction register 46 and the FIFO memory 70 can be made small.

In the example of FIG. 14, only the instruction code sections (10 to 11, 22 to 39) within the program data (0 to 45) were encoded, but the encoding of other data portions (for example, the address portion) is also possible in response to requirements.

The above-mentioned embodiments were related to an SVP, but the present invention is also applicable to SIMD type instruction processes of other configurations, and furthermore, is applicable to optional processors that are equipped with functions that repeatedly execute one instruction over multiple clock cycles.

As was explained above, according to the processor of the present invention, the operating throughput can be increased, and the processing performance improved for a repetitive execution processing unit in a system that repetitively executes a single instruction over multiple clock cycles. Also, by appropriately encoding instructions, the required memory capacity of the program memory in which they are stored can be reduced.

What is claimed is:

1. Processor comprising:
    a first instruction execution unit that repetitively executes a first-type instruction on one or a plurality of microprocessors,
    a second instruction execution unit that independently executes a second-type instruction from the first instruction execution unit,
    a program memory that stores a program containing instructions of the first type and instructions of the second type,
    an instruction reader that sequentially reads out instructions of the first type and the second type from the program memory according to the execution sequence for the program,
    and an instruction execution controller that, when an instruction of the second type is read from the program memory during the execution of an instruction of the first type, executes the instruction of said second type in the second instruction unit in parallel with the execution of the instruction of the first type in the first instruction execution unit.

2. Processor of claim 1, wherein
    the first instruction execution unit has
    a processing unit that executes the process designated by the instruction code of a first-type instruction within one clock cycle
    a microinstruction register that, in regard to the instructions of the first type that are read from the program memory, applies the instruction code of that instruction to the processing unit as a microinstruction,
    an address counter that, for each instruction of the first type that is read from the program memory, sequentially applies to the processing unit data addresses related to those instructions while incrementing or decrementing in each single clock cycle from an initial value to a prescribed end value, and a repeat counter that, in regard to each instruction of the first type that is read from the program memory, counts the number of times the process designated by the instruction code is repeatedly executed in the processing unit.

3. Processor of claim 1 having a first-in first-out type memory that stores the instructions of the first type that are read from the memory in a first-in first-out format, and applies the instructions of the first type that are read to the first instruction execution unit.

4. Processor of claim 3 wherein the first instruction execution unit has a processing unit that executes a process designated by the instruction code of an instruction of the first within one clock cycle, a microinstruction register that, in regard to each instruction of the first type that is read from the first-in first-out type memory, applies the instruction code of that instruction to the processing unit as a microinstruction, an address counter that, for each instruction of the first type that is read from the first-in first-out type memory, sequentially applies to the processing unit data addresses related to those instructions while incrementing or decrementing in each single clock cycle from an initial value to a prescribed end value, and a repeat counter that, in regard to each instruction of the first type that is read from the first-in first-out type memory, counts the number of times the process designated by the instruction code is repeatedly executed in the processing unit.

5. Processor of claim 3 wherein prescribed instructions of the second type to be executed in synch with the execution sequence for the instructions of the first type are also stored in the first-in first-out type memory, and the prescribed instructions of the second configuration are executed by means of the second instruction execution unit at the point in time at which they are read from the first-in first-out type memory.

6. Processor of claim 1 wherein in the program memory, a part or all of each instruction encoded and stored, and in which a decoder is provided that decodes the instructions read from the program.

7. Processor of claim 1 wherein the processing unit has a number of processing elements allocated in a 1 to 1 ratio with the number of pixels in a scan line which perform the same operations according to a common instruction of the first type, and in which the input image signals are processed in scan line units.

8. Processor of claim 4 wherein prescribed instructions of the second type to be executed in synch with the execution sequence for the instructions of the first type are also stored in the first-in first-out type memory, and the prescribed instructions of the second configuration are executed by means of the second instruction execution unit at the point in time at which they are read from the first-in first-out type memory.

9. Processor of claim 2 wherein in the program memory, a part or all of each instruction is encoded and stored, and in which a decoder is provided that decodes the instructions read from the program.

10. Processor of claim 3 wherein in the program memory, a part or all of each instruction is encoded and stored, and in which a decoder is provided that decodes the instructions read from the program.

11. Processor of claim 4 wherein in the program memory, a part or all of each instruction is encoded and stored, and in which a decoder is provided that decodes the instructions read from the program.

12. Processor of claim 2 wherein the processing unit has a number of processing elements allocated in a 1 to 1 ratio with the number of pixels in a scan line which perform the same operations according to a common instruction of the first type, and in which the input image signals are processed in scan line units.

13. Processor of claim 3 wherein the processing unit has a number of processing elements allocated in a 1 to 1 ratio with the number of pixels in a scan line which perform the same operations according to a common instruction of the first type, and in which the input image signals are processed in scan line units.

14. Processor of claim 4 wherein the processing unit has a number of processing elements allocated in a 1 to 1 ratio with the number of pixels in a scan line which perform the same operations according to a common instruction of the first type, and in which the input image signals are processed in scan line units.

15. Processor of claim 5 wherein the processing unit has a number of processing elements allocated in a 1 to 1 ratio with the number of pixels in a scan line which perform the same operations according to a common instruction of the first type, and in which the input image signals are processed in scan line units.

* * * * *